(12) United States Patent
Kanno

(10) Patent No.: US 6,564,028 B2
(45) Date of Patent: May 13, 2003

(54) METHOD OF INITIALIZING AN IMAGE READING DEVICE

(75) Inventor: Tohru Kanno, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/917,922

(22) Filed: Jul. 31, 2001

(65) Prior Publication Data

US 2002/0048470 A1 Apr. 25, 2002

(30) Foreign Application Priority Data

Jul. 31, 2000 (JP) .................................... 2000-232198
Jun. 14, 2001 (JP) .................................... 2001-179562

(51) Int. Cl.[7] ........................ G03G 15/00; G03G 15/30
(52) U.S. Cl. ...................... 399/205; 358/474; 399/211
(58) Field of Search .............................. 399/205, 206, 399/208, 211; 358/474, 483

(56) References Cited

U.S. PATENT DOCUMENTS

| | | | | |
|---|---|---|---|---|
| 4,862,284 A | * | 8/1989 | Murata | 358/474 X |
| 5,109,288 A | | 4/1992 | Moriya | 358/497 |
| 5,214,518 A | * | 5/1993 | Kato | 358/474 X |
| 5,583,620 A | * | 12/1996 | Miyamoto | 399/208 |
| 5,734,758 A | * | 3/1998 | Yamamoto et al. | 358/474 X |

FOREIGN PATENT DOCUMENTS

| | | | |
|---|---|---|---|
| EP | 0 260 892 | | 3/1988 |
| EP | 0 441 535 | | 8/1991 |
| EP | 0 751 669 | | 1/1997 |
| JP | 11-136453 | * | 5/1999 |
| WO | WO 95/11565 | | 4/1995 |

OTHER PUBLICATIONS

Patent Abstracts of Japan, JP 2000–115473, Apr. 21, 2000.

* cited by examiner

*Primary Examiner*—Fred L. Braun
(74) *Attorney, Agent, or Firm*—Oblon, Spivak, McClelland, Maier & Neustadt, P.C.

(57) ABSTRACT

An image processing apparatus, method, and computer program product including a carriage for carrying an image reading device; a white plate arranged above a track of the carriage, and read by the image reading device for adjusting a reading level; a home position sensor to detect the position of the carriage; and a controller to control the movement of the carriage. The controller is configured to determine the direction of movement of the carriage based on the output of the home position sensor, and to perform a tentative homing operating when the home position sensor changes its output after the carriage is moved.

47 Claims, 24 Drawing Sheets

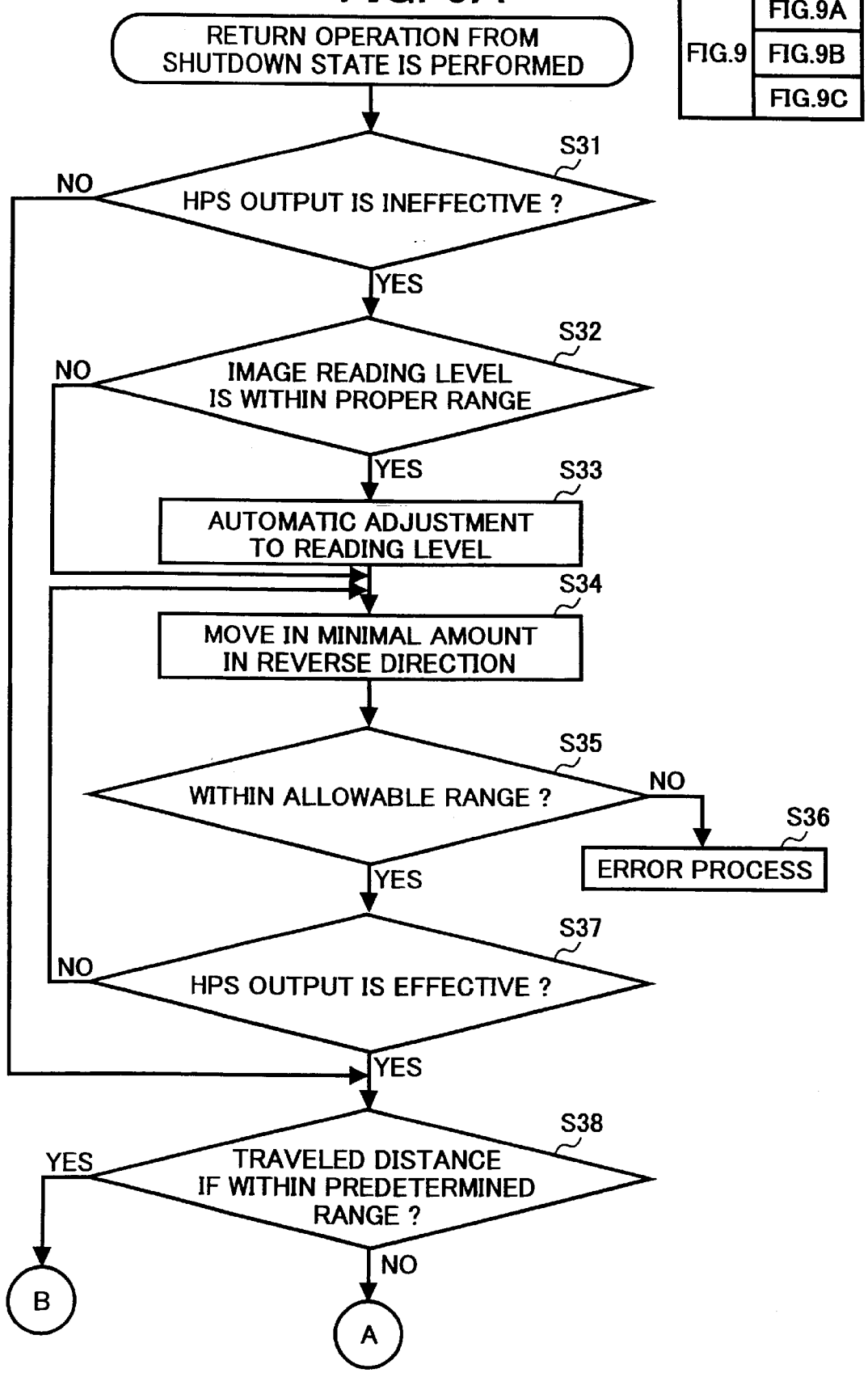

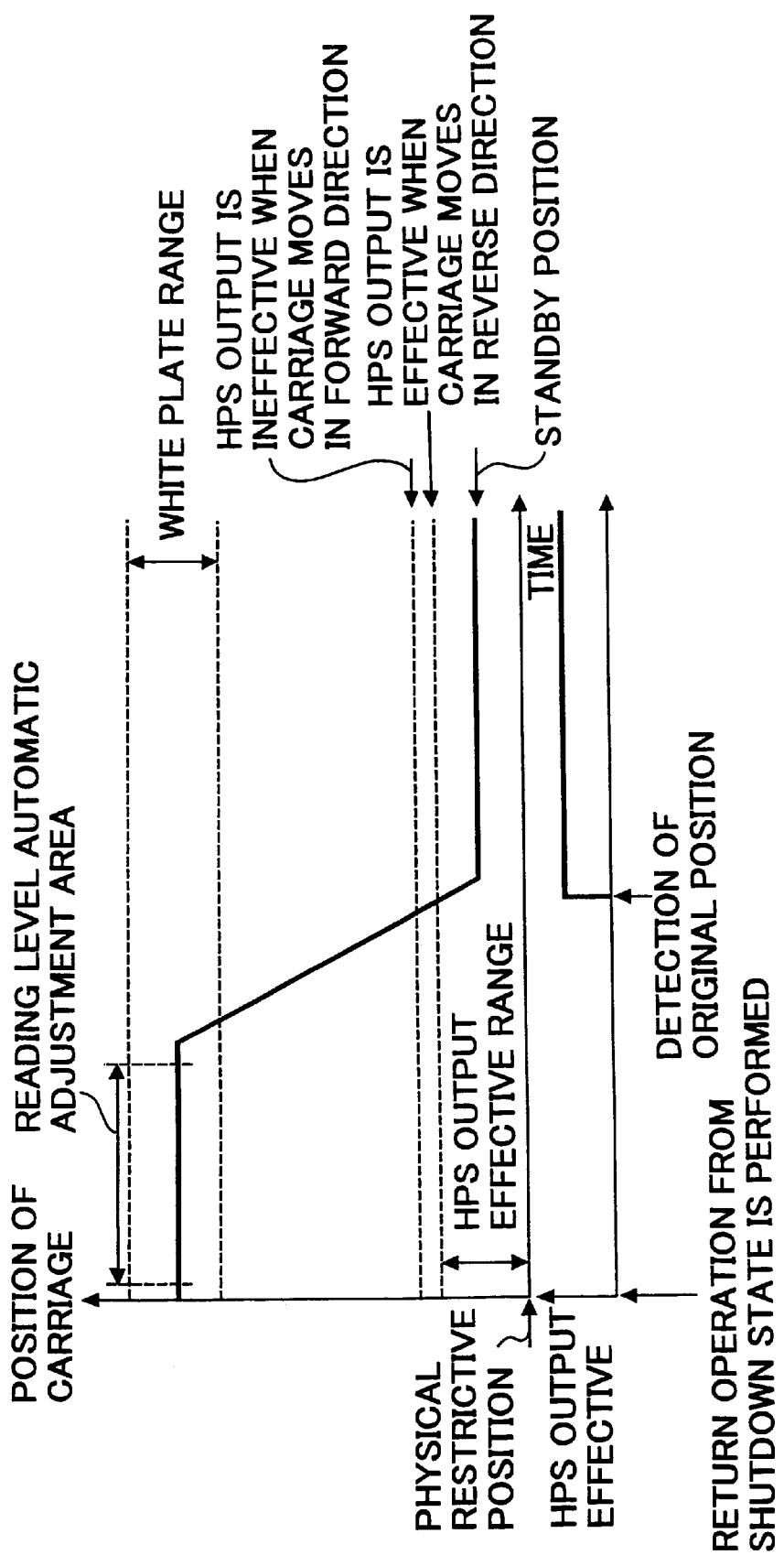

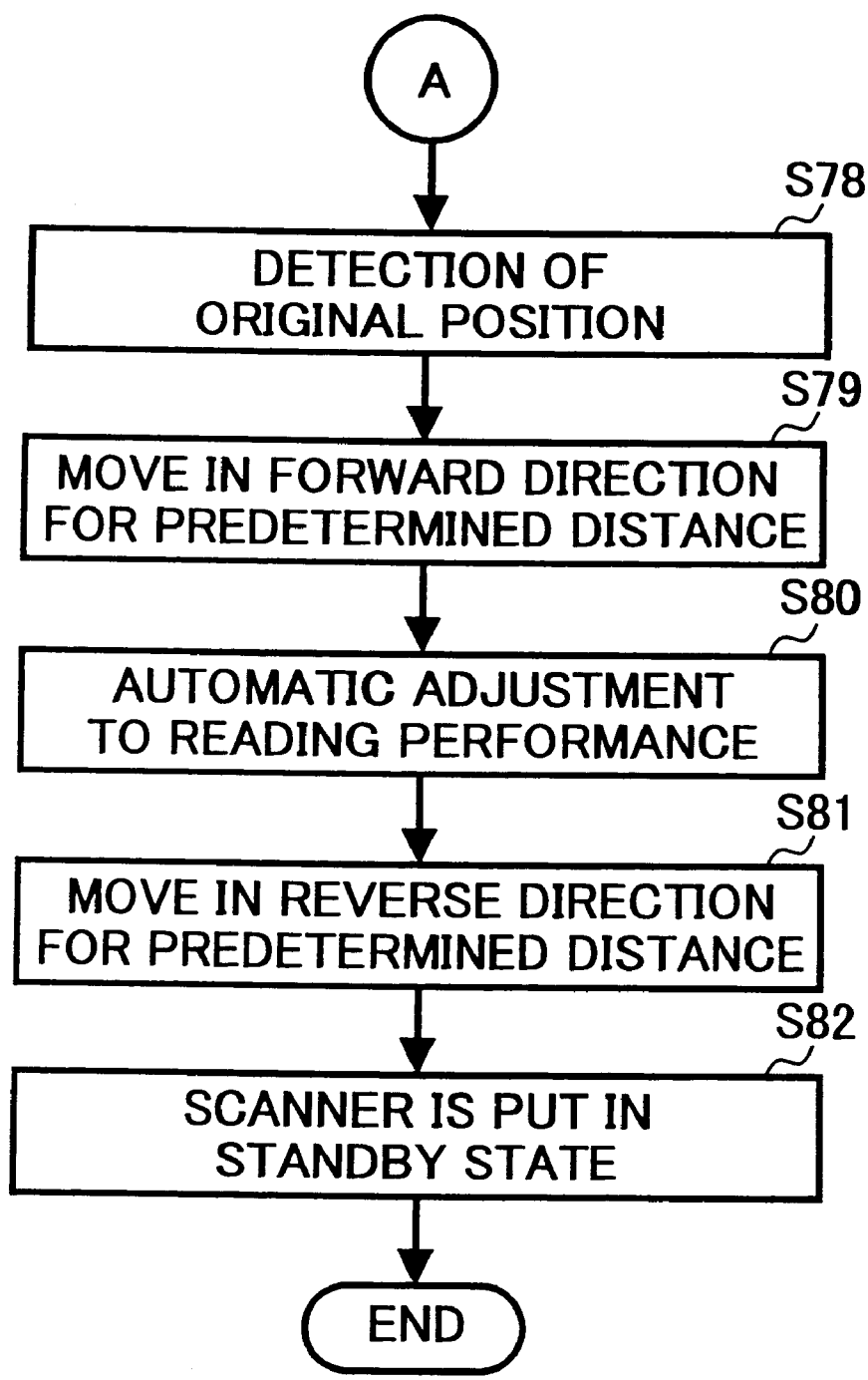

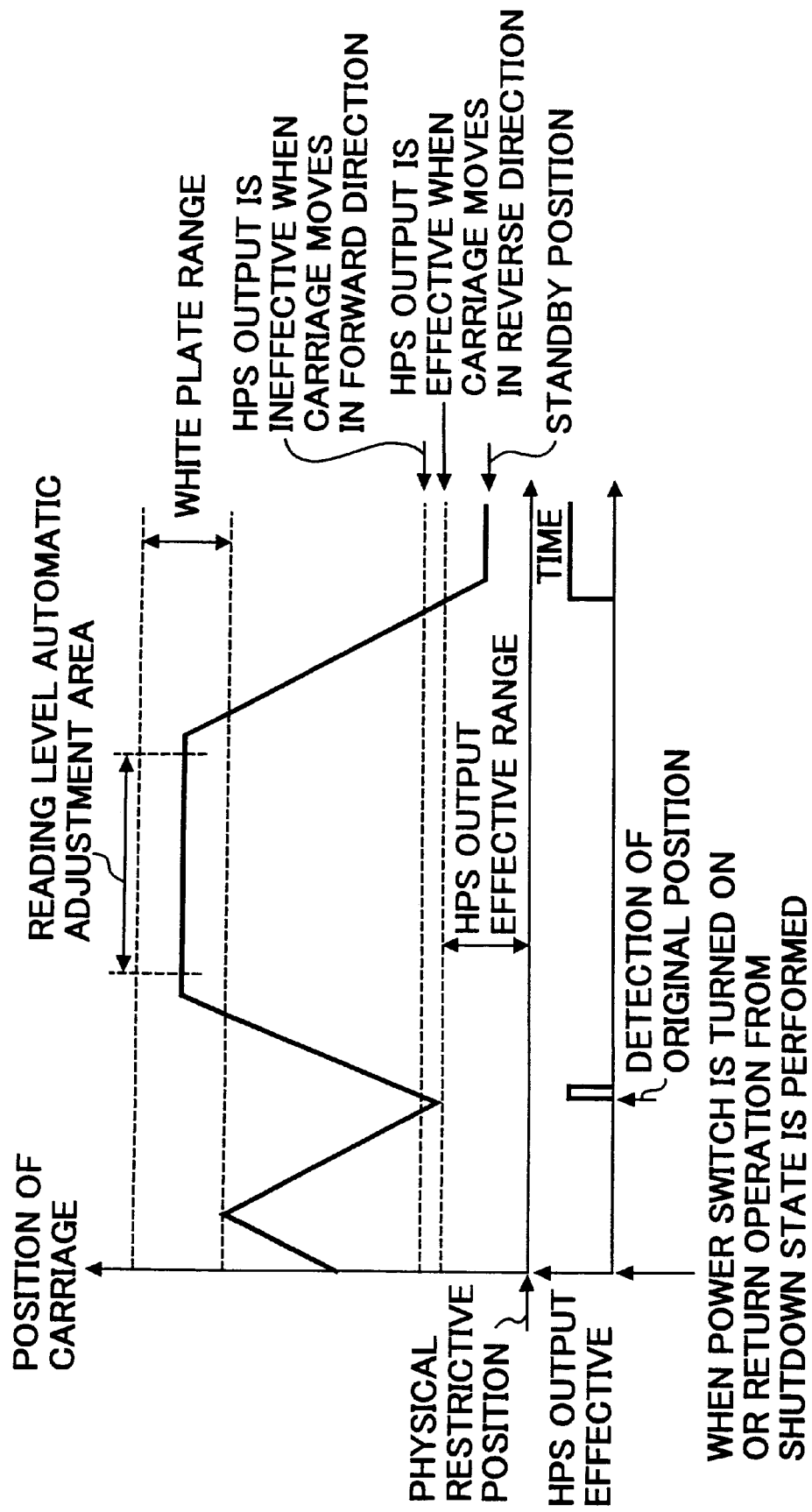

METHOD OF INITIALIZING AN IMAGE READING DEVICE

BACKGROUND OF THE INVENTION

1. Field of the Invention

The present invention relates to a method and a computer program product for initializing a scanner to be used in an image processing apparatus, such as a multifunctional DPPC (i.e., Digital Plain Paper Copier), and more particularly to a method and a computer program product that can control the movement of the carriage of the scanner for performing the initializing process of the scanner in a short period of time.

2. Discussion of the Background

The recently developed DPPC may be configured such that power is supplied to the whole system of the DPPC by turning on the power switch. Further, the DPPC may be put in the shutdown state by stopping the power supply using a power key (e.g., a soft key), except some power may still be supplied to a monitoring part. In these types of DPPC's, when the power switch is turned on or when a return operation from the shutdown state is performed, an initializing process of the scanner is performed. In the initializing process of the scanner, an automatic adjustment to the reading function of the scanner is made after the homing operation of the scanner is completed. An image reading device carried by the carriage reads a white plate arranged above the track of the carriage. The read image is then converted into an electric signal by an image sensor (i.e., generally, a CCD linear image sensor is used).

The automatic adjustment to the reading performance of the scanner is made based on the output electric signal. The output electric signal generated by reading the white plate includes various distortions caused by variations in the reading optical system, the lighting system, and the image sensor, etc. Therefore, shading data, for performing a correction in the analog signal process and the analog/digital conversion process, which are performed in the signal processing system of the image sensor, is acquired based on the detected value of the distortions. The automatic adjustment to the reading performance of the scanner is made based on the acquired shading data for correcting the variation in the sensitivity of the sensor (i.e., CCD sensor) and the uneven distribution of light of the lighting system.

In the scanner, the movement of the carriage which carries the reading device is controlled according to respective conditions when the initializing process is performed or when an image reading operation of the original document is performed. As illustrated in FIG. 14, the carriage is controlled to move in the forward or in the reverse directions within the home position sensor active (effective) range, the white plate active (effective) range, and the original document reading range. The three ranges are provided in order along the track of the carriage. In the home position sensor active (effective) range, the output of the home position sensor (i.e., HPS) to detect the position of the carriage is active (effective). In the white plate active (effective) range, the white plate is arranged and the white plate reading signal is active (effective).

In the initializing process of the scanner, the homing operation, which is performed based on the output of the HPS, and the reading operation of the white plate are performed. The white plate is provided between the HPS active (effective) range and the original document reading range.

The initializing process is described below referring to the flowchart in FIG. 15, which illustrates initializing process steps of the scanner when the power switch is turned on or when the return operation from the shutdown state is performed.

According to the steps, the carriage firstly moves in a forward direction for a predetermined distance to reach a position where the output of the HPS is apparently inactive (ineffective) at step S71. That is, the carriage moves toward the white plate or the original document side until it reaches the position where the output of the HPS is inactive (ineffective) after passing through the range where the output of the HPS is active (effective) wherever the carriage is positioned. Then, whether or not the output of the HPS is inactive (ineffective) is checked at step S72.

When it is determined that the output of the HPS is inactive (ineffective), whether or not the output of the HPS switches (changes) to be active (effective) from being inactive (ineffective) is checked at step S77 while moving the carriage in a minimal amount in a reverse direction at step S74. When it is determined that the output of the HPS switches (changes) to be active (effective), the position of the scanner is detected as the original position (i.e., a fiducial position) for the scanning operation at step S78 (i.e., a homing operation). When the output of the HPS does not switch (change) to be inactive (ineffective) even if the carriage is moved by the predetermined distance at step S72 (i.e., No at step S72) or when the output of the HPS does not switch (change) to be active (effective) even if the carriage is moved in the reverse direction within the allowable range at step 74 (i.e., No at step S75), it is determined that the scanner malfunctions. Error processes, for example, to stop the operation, are performed at steps S73 and S76.

The carriage then moves in the forward direction for a predetermined distance at step S79 from the detected original position to reach a position where the white plate is read. An automatic adjustment to the reading performance of the scanner is made at step S80 based on the read value of the white plate. When the adjustment is made, the carriage moves for a predetermined distance in the reverse direction to a standby position (i.e., original position) at step S81. The scanner is put into the standby state at step S82. The process is then finished.

The initializing process operation performed according to the above-described processing steps is further explained referring to timing diagrams in FIGS. 16 through 18 which show the mutual relationship between the position of the carriage and the output of the HPS.

The timing diagrams in FIGS. 16 through 18 illustrate that the carriage is located in a different position at power-on time. In FIG. 16, the position of the carriage is shifted to the side of the white plate with respect to the switching (changing) point of the output of the HPS. In FIG. 17, the carriage is positioned close to the switching (changing) point of the output of the HPS. In FIG. 18, the position of the carriage is shifted to the side of the physical restrictive position with respect to the switching (changing) point of the output of the HPS. According to these examples of the present invention, a sensor having a hysteresis property in which the switching (changing) point of the output differs according to the moving direction is used as the HPS to detect active (effective) and inactive (ineffective) positions. The original position of the carriage is then detected when the output of the sensor switches (changes) to be active (effective) from being inactive (ineffective) while the carriage moves in the reverse direction.

In any of these examples shown in FIGS. 16 through 18, the homing operation is started after the carriage moves in the forward direction for a predetermined distance to reach the position where the output of the HPS is apparently inactive (ineffective). That is, the original position of the scanner for the scanning operation is detected when the output of the HPS switches (changes) to be active (effective) from being inactive (ineffective) while the carriage moves in the reverse direction. Therefore, the example shown in FIG. 16 (i.e., when the position of the carriage is shifted to the side of the white plate with respect to the switching (changing) point of the output of the HPS) requires the longest poriod of time for detecting the original position of the scanner among the examples shown in FIGS. 16 through 18. The same operation is performed in any of the examples shown in FIGS. 16 through 18 until the scanner is put in the standby state after the initializing process including the detection of the original position of the scanner and the automatic adjustment to the reading performance of the scanner is completed. Thus, the example shown in FIG. 16 requires the longest period of time for return (change) operation from the shutdown state.

The initializing process of the scanner is thus performed by controlling the movement of the carriage as described above when the power switch is turned on or when the return operation from the shutdown state is performed. Generally, this initializing processing operation is directly controlled by the control section of the main body of the DPPC. FIG. 19 is a block diagram illustrating an example of the system for controlling the initializing process of the scanner. An output of the HPS 26 is input to the main body control CPU 30. The main body control CPU 30 directly controls the motor driver 24 for the scanner motor 21. The main body control CPU 30 controls each component of the DPPC including the image processing section 31 which processes read image data.

Therefore, the initializing process of the scanner, which is executed when the power switch is turned on or when the return operation from the shutdown state is performed, is performed based on a program of the main body. Because the initializing process of the scanner is performed after the initialing process of the main body is completed, a relatively long period of time is required before the scanner is put in the standby state.

This initializing process of the scanner may be performed by controlling the movement of the carriage independently. FIG. 20 is a block diagram illustrating an example of the system for controlling the movement of the carriage independently. The output of the HPS 26 is input to the scanner control CPU 25. The scanner control CPU 25 controls the motor driver 24 for the scanner motor 21 independently of the main body control CPU 30. According to this system, the homing operation of the scanner is performed without waiting the completion of the initializing process of the main body, thereby reducing the time required to initialize the scanner.

Conventionally, the time required to perform the initializing process of the scanner, such as the homing operation and the automatic adjustment is longer than the time required to warm-up the main body. Therefore, the time required to initialize the scanner is not an important factor in the amount of time required to place the DPPC in the operational state (i.e., in the startup time).

However, considerable efforts are being put into reducing the startup time of the DPPC. As a result, the time required for the warm-up process of the main body has drastically been shortened. Therefore, the time required to initialize the scanner is an important factor in the amount of time required to put the DPPC in the operational state.

SUMMARY OF THE INVENTION

The present invention has been made in view of the above-mentioned and other problems and addresses the above-discussed and other problems.

The present invention advantageously provides a novel image processing apparatus, method, and computer program product that can perform the initializing process of the scanner in a short period of time.

According to an example of the present invention, the image processing apparatus includes a carriage configured to carry an image reading device, a white plate configured to be read by the image reading device for adjusting a reading level of the image reading device, a home position sensor configured to detect the position of the carriage, and a controller configured to control the movement of the carriage. The controller moves the carriage based on the output of the home position sensor to perform an initializing process of the image reading device including a homing operation and a white plate reading operation.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 10 is a timing diagram showing the operation of the carriage when the carriage is positioned in the white plate range;

FIG. 16 is a timing diagram showing an operation of the initializing process performed in FIG. 15 when the position of the carriage is shifted to the side of the white plate with respect to the switching (changing) point of the output of the home position sensor;

DETAILED DESCRIPTION OF THE PREFERRED EMBODIMENTS

Figure 1:
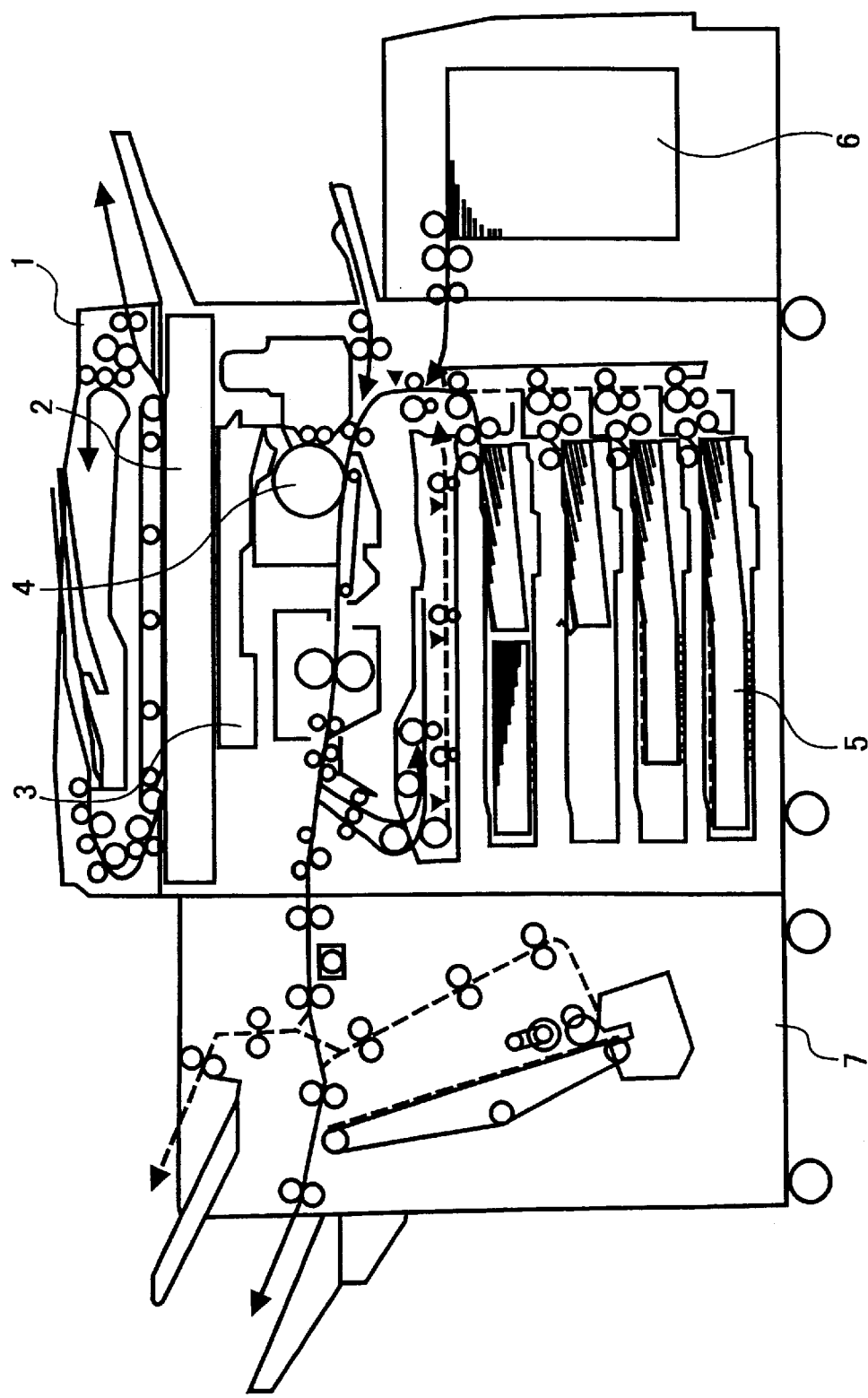
FIG. 1 is a schematic drawing illustrating the construction of a DPPC according to an example of the present invention.

Referring now to the drawings, wherein like reference numerals designate identical or corresponding parts throughout the several views, an example of the present invention is now described below referring to attached figures. According to the example, the present invention is applied to a DPPC (i.e., Digital Plain Paper Copier) as an image processing apparatus.

FIG. 1 is a schematic drawing illustrating the overall construction of the DPPC according to the present invention. As shown in FIG. 1, the DPPC includes an automatic document feeder 1, a scanner unit 2, a writing unit 3, a processing unit 4, a first sheet feeding unit 5, a second sheet feeding unit 6, and a sheet discharging unit 7.

A summary of the operation of the DPPC is now explained. An original document placed on the document feeding tray provided in the automatic document feeder 1 is fed to a predetermined position on a platen arranged in the scanner unit 2 by the document feeding device, when the start key provided in the operation unit (not shown) is depressed. The image of the original document is read by the scanner unit 2 and the original document is then discharged to the document discharging tray. Further, the reading operation of the image of the original document is automatically repeated one after another, when there are a plurality of original documents. In the writing unit 3, a laser beam is emitted according to imaging data obtained by reading the image of the original document in the scanner unit 2. A latent image is then formed on the surface of a photoconductive element. The latent image formed on the surface of the photoconductive element is developed into a toner image by the developing section in the processing unit 4. The toner image is then transferred onto a transfer sheet supplied either from the first sheet feeding unit 5 or the second sheet feeding unit 6. The toner image transferred onto the transfer sheet is then fixed by the fixing section in the processing unit 4. The transfer sheet carrying the fixed image is discharged to an exit tray by the sheet discharging unit 7.

Figure 2:
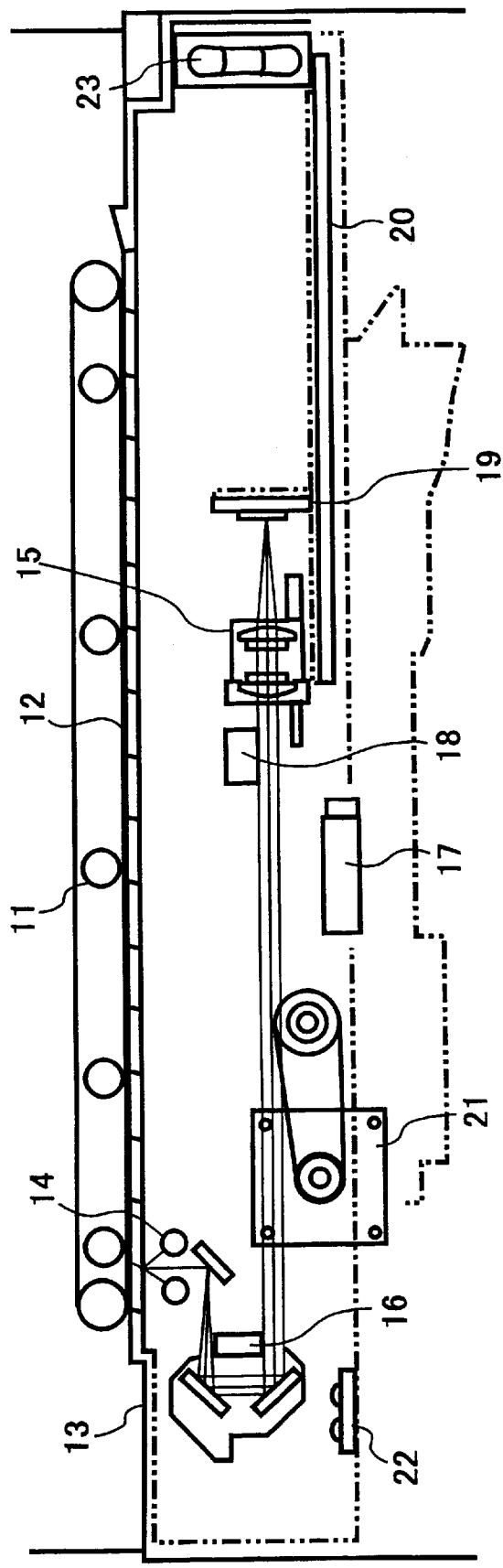
FIG. 2 is a schematic drawing illustrating details of the scanner unit in FIG. 1.

Details of the scanner unit 2 of the DPPC are described below. FIG. 2 illustrates the construction of the scanner unit 2 shown in FIG. 1. The scanner unit 2, according to an example of the present invention, includes a document feeding belt 11, a platen 12, a white plate 13, a lamp 14, and a lens 15. The scanner unit 2 further includes an HPS (i.e., Home Position Sensor) 16, a first document size detection sensor 17, a second document size detection sensor 18, a sensor board 19, a scanner control board 20, the scanner motor 21, a heater 22, and a cooling fan 23.

In the scanner unit 2, an original document placed on the platen 12 is conveyed by the document feeding belt 11 and is irradiated with the lamp 14. The light reflected from the original document is then reflected by three mirrors to the lens 15 so as to form an image on a CCD (i.e., Charge-Coupled Device) image sensor provided on the sensor board 19. The lamp 14 and a group of mirrors are carried by a carriage which is driven by the scanner motor 21 with a wire. These components provide an image obtained while scanning an original document to the CCD image sensor arranged on the sensor board 19. The CCD image sensor then converts the received light into an electric signal, and transmits the electric signal to the image processing section of the scanner control board 20 as the image data of the original document.

Figure 19:
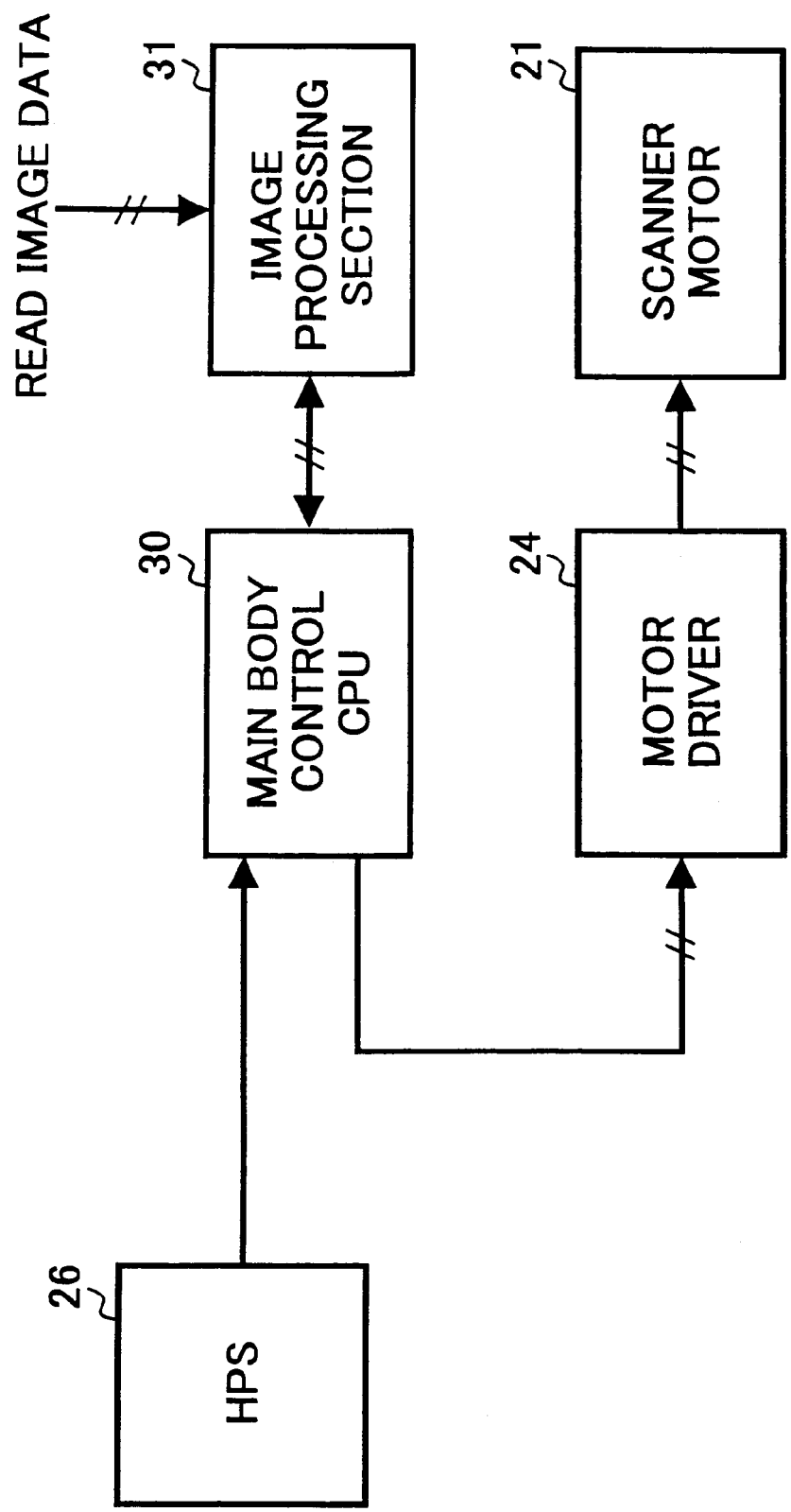
FIG. 19 is a block diagram illustrating a conventional system in which the movement of the scanner is controlled by the control section of the main body of the DPPC.
Figure 20:
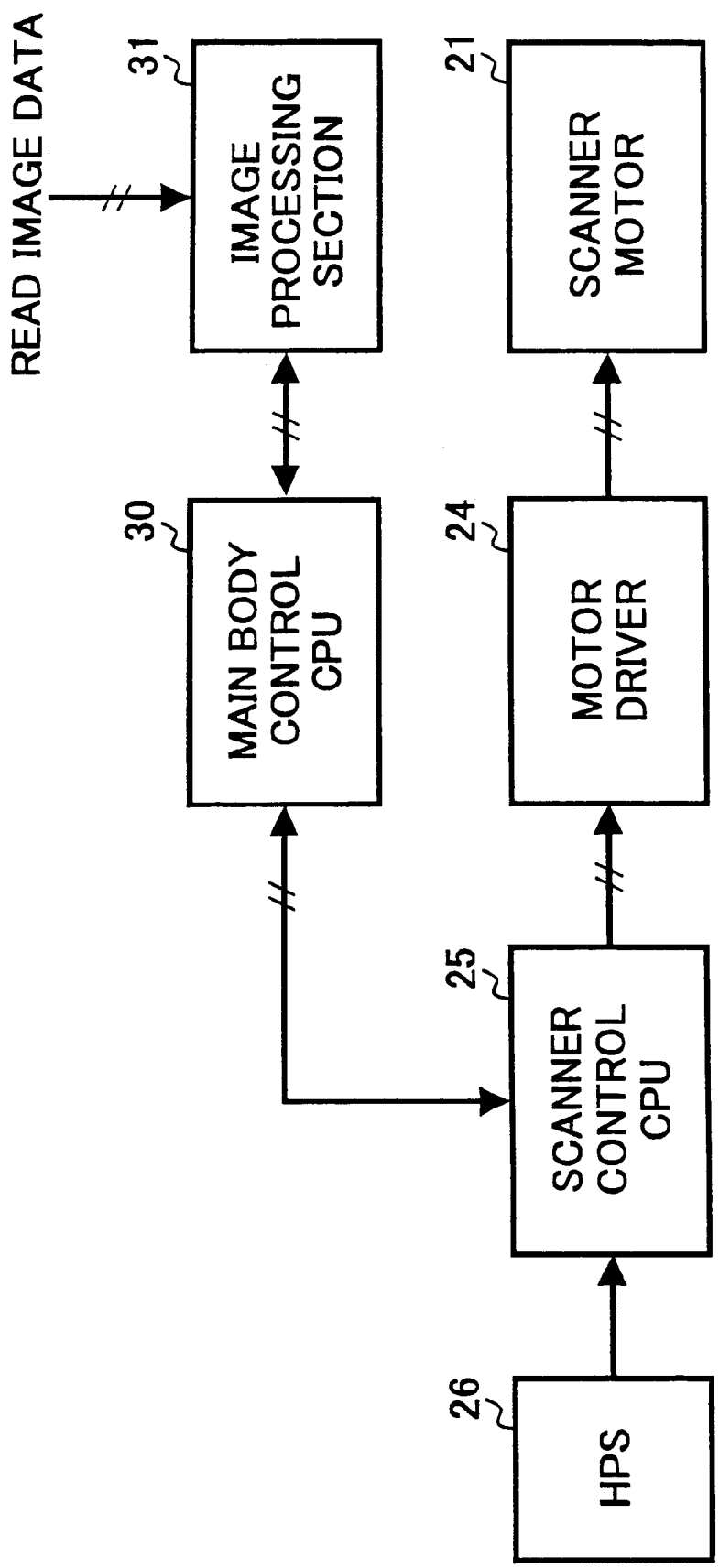
FIG. 20 is a block diagram illustrating a conventional system in which the movement of the scanner is controlled by the control section of the scanner.

The first and second document size detection sensors 17 and 18 detect the size of the original document. The control section of the main body of the DPPC (not shown) directly controls an initializing process (such as a homing operation and an adjustment of the output power level of the image reading section) and the scanner motor 21 which performs a scanning operation on the original document. The control section of the main body of the DPPC controls the whole system relation and the imaging sequence. A diagram in FIG. 19 illustrating the configuration of the control system corresponds to this direct control system of the main body of the DPPC. The image of the white plate 13 is read, and the read image is used as reference data for adjusting the output power level of the image reading section. The scanner control board 20 controls the heater 22 (to prevent the formation of condensation) and the cooling fan 23.

The initializing process of the scanner according to the present invention, which can be applied to the DPPC, is described below referring to the following examples. According to a first example of the present invention, the moving direction of the carriage is determined based on the output of the home position sensor 16 when the power switch is turned on or when an instruction for a return operation from the shutdown state is provided (hereinafter referred to as power-on time). Thus, the moving distance of the scanner to the point where the output of the home position sensor 16 switches (changes) to be active (effective) from being inactive (ineffective) or vice versa (i.e., switching (changing) point) is shortened and the original position of the scanner is detected quickly (herein a tentative original position is detected), resulting in a shortened period of time required for the initialing process of the scanner.

Figure 3A:
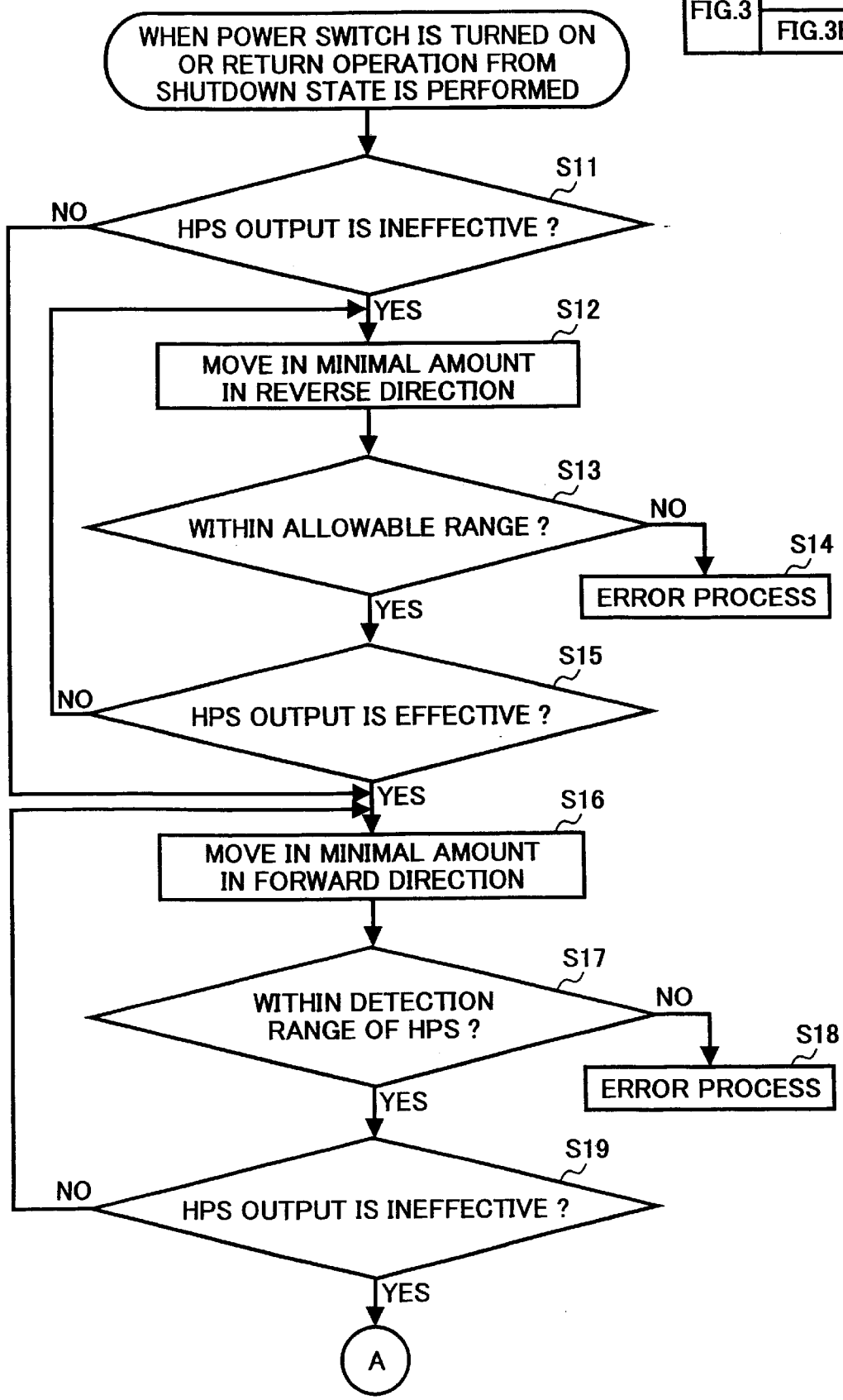
FIG. 3 is a flowchart showing an initializing operation performed when the power switch is turned on or when a return operation from the shutdown state is performed.
Figure 3B:
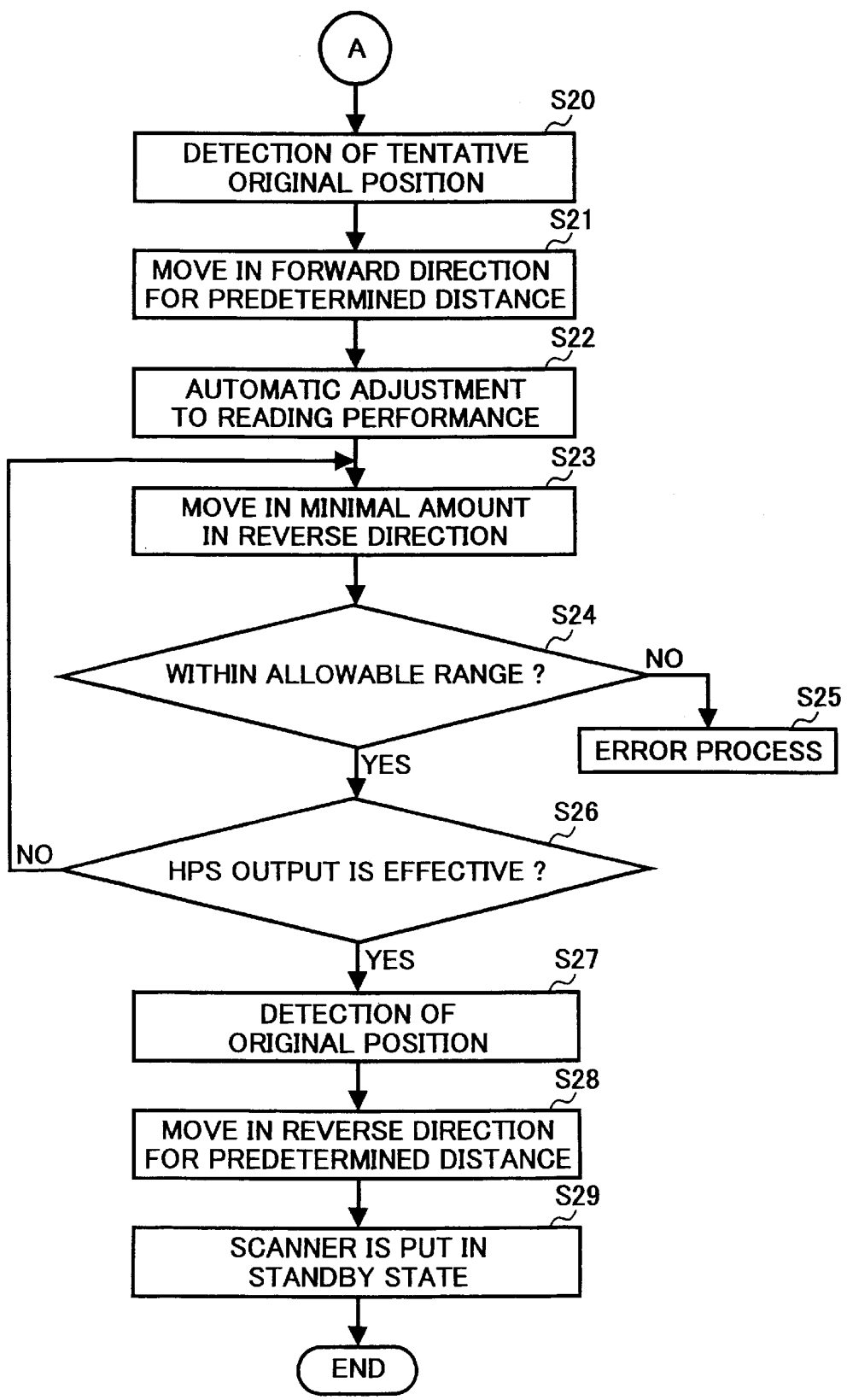

The initializing process operation according to an example of the present invention is described below referring to the flowchart in FIG. 3 which illustrates initializing process steps of the scanner when the power switch is turned on or when the return operation from the shutdown state is performed. According to the steps, whether or not the output of the home position sensor 16 is inactive (ineffective) is judged firstly at step Si1 to determine whether or not the carriage is positioned within the detection range of the home position sensor 16 at a power-on time. When the output of the home position sensor 16 is judged to be inactive (ineffective), i.e., when the carriage is positioned in the side of the white plate 13 with respect to the switching (changing) point of the output of the home position sensor 16, whether or not the output of the home position sensor 16 switches (changes) to be active (effective) is checked at step S15 while moving the carriage in a minimal amount in a reverse direction toward the switching (changing) point of the output of the home position sensor 16 at step S12. When it is determined that the output of the home position sensor 16 switches (changes) to be active (effective), the carriage is then moved in the forward direction toward the white plate 13 at step S16. When the output of the home position sensor 16 does not switch (change) to be active (effective) even if the carriage is moved in the reverse direction within an allowable range at step S12 (i.e., No at step S13), it is determined that the scanner malfunctions. Error processes, for example, to stop the operation, are performed at step S14.

Then, whether or not the output of the home position sensor 16 switches (changes) to be inactive (ineffective) is checked at step S19 while moving the carriage in a forward direction in the minimal amount toward the white plate 13 at step S16. When the output of the home position sensor 16 switches (changes) to be inactive (ineffective), the position of the scanner is detected as the tentative original position for the scanning operation at step S20. When the output of the home position sensor 16 does not switch (change) to be inactive (ineffective) even if the carriage is moved for a predetermined distance at step S16 (i.e., No at step S17), it is determined that the scanner malfunctions. Error processes, for example, to stop the operation, are performed at step S18.

The carriage moves in the forward direction for a predetermined distance at step S21 from the tentative original position detected at step S20 to reach a position where the white plate 13 is read. An automatic adjustment to the reading performance of the scanner is made based on a read value of the white plate 13 at step S22. When the adjustment is made, the carriage moves to the standby position (i.e., the position where the carriage is in the standby state until an instruction to perform the reading operation of an original document is provided). The original position, which is used when controlling the position of the carriage for reading the original document, is detected while the carriage is moved to the standby position. That is, in the flowchart, whether or not the output of the home position sensor 16 switches (changes) to be active (effective) at step S26 while moving the carriage in the reverse direction in a minimal amount toward the switching (changing) point of the output of the home position sensor 16 at step S23. When the output of the home position sensor 16 switches (changes) to be active (effective), the position of the carriage is detected as the original position of the carriage for the scanning operation at step S27.

When the output of the home position sensor 16 does not switch (change) to be active (effective) even if the carriage is moved in the reverse direction within the allowable range at step S23 (i.e., No at step S24), it is determined that the scanner malfunctions. Error processes, for example, to stop the operation, are performed at step S25.

After the original position is detected, the carriage moves in the reverse direction for a predetermined distance from the original position at step S28 so as to put the carriage into the standby state at the predetermined position. The scanner remains in the standby state at step S29. The process is then finished.

Figure 4:
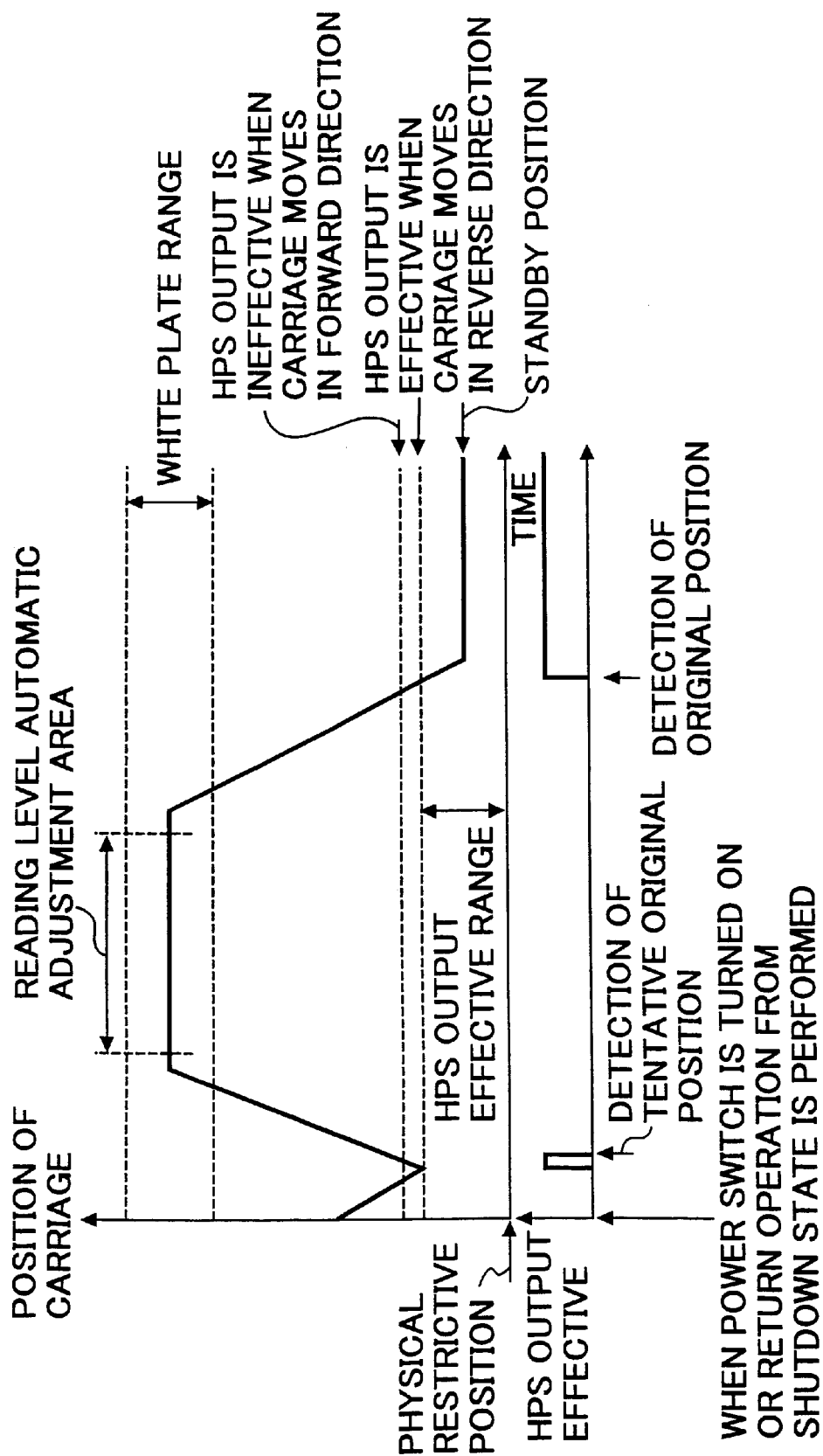
FIG. 4 is a timing diagram showing the operation of the initializing process performed when the position of the carriage is shifted to the side of the white plate with respect to the switching (changing) point of an output of the home position sensor.
Figure 5:
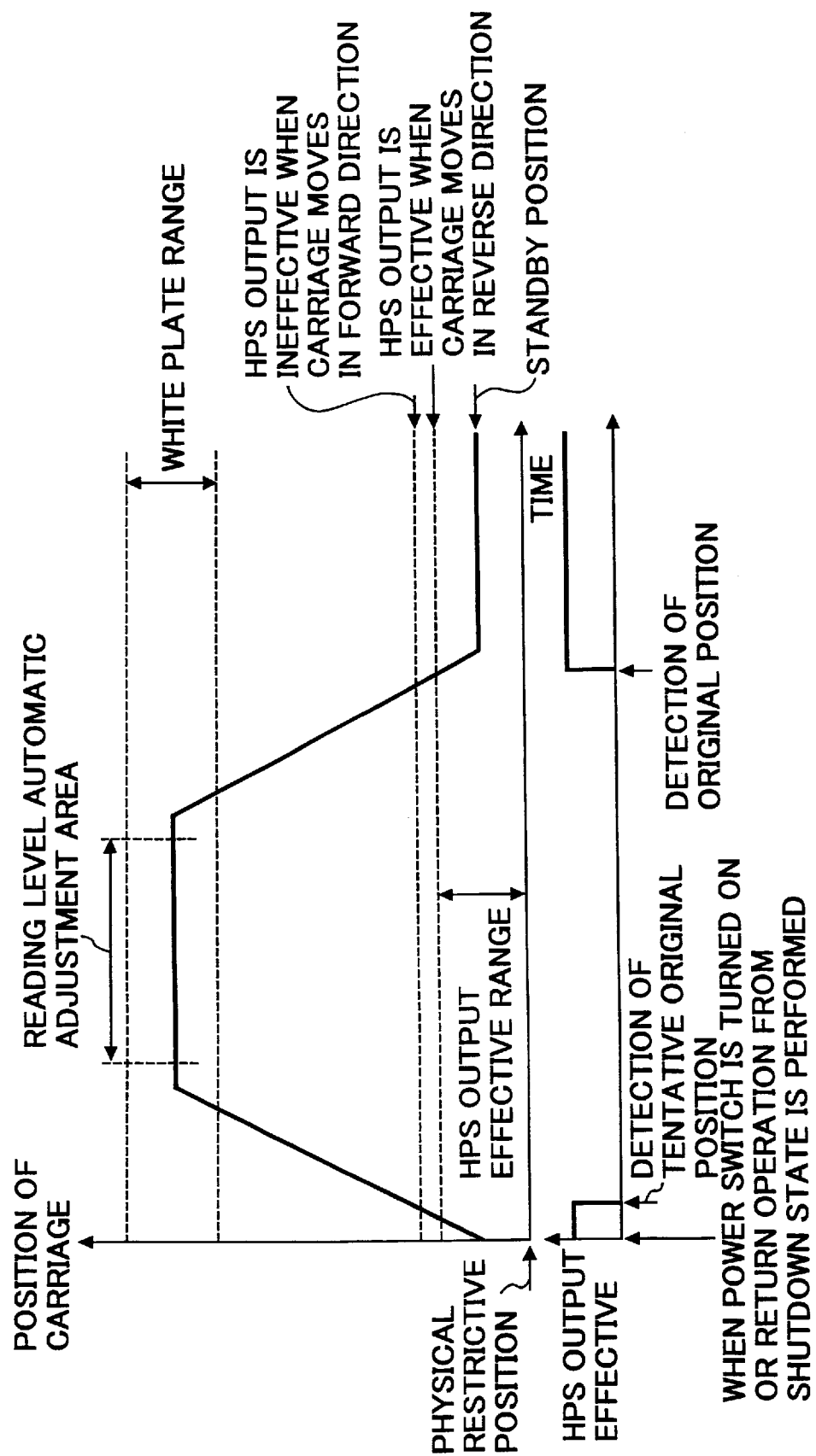
FIG. 5 is a timing diagram showing the operation of the initializing process performed when the carriage is positioned close to the switching (changing) point of the output of the home position sensor.
Figure 6:
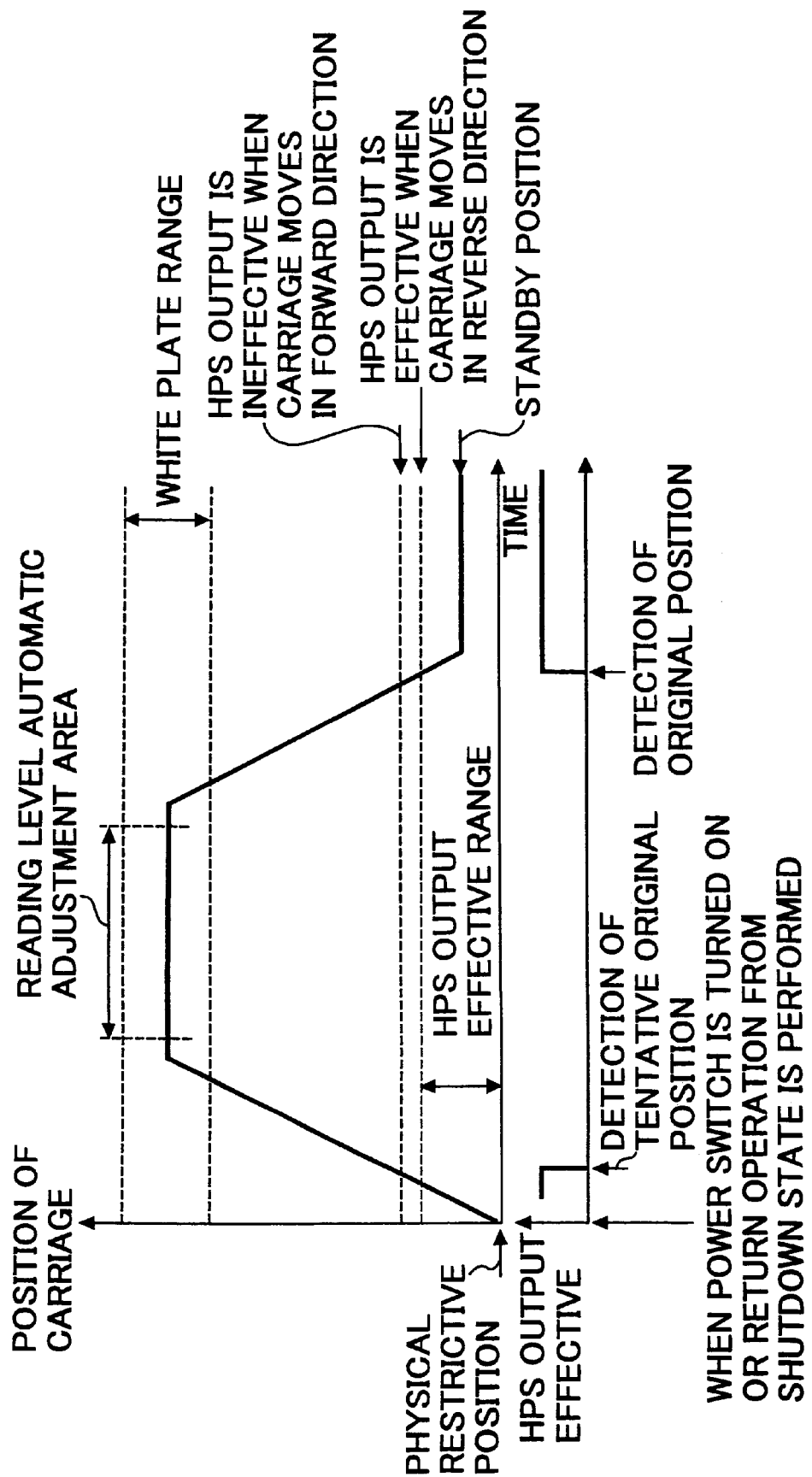
FIG. 6 is a timing diagram showing the operation of the initializing process performed when the position of the carriage is shifted to a side of a physical restrictive position with respect to the switching (changing) point of the output of the home position sensor.

The initializing process operation performed according to the above-described processing steps is further explained referring to timing diagrams in FIGS. 4 through 6 which show the mutual relationship between the position of the carriage and the output of the home position sensor 16.

The timing diagrams in FIGS. 4 through 6 illustrate that the carriage is located in a different position at power-on time. In FIG. 4, the position of the carriage is shifted to the side of the white plate 13 with respect to the switching (changing) point of the output of the home position sensor 16. In FIG. 5, the carriage is positioned close to the switching (changing) point of the output of the home position sensor 16. In FIG. 6, the position of the carriage is shifted to the side of the physical restrictive position with respect to the switching (changing) point of the output of the home position sensor 16. According to these examples of the present invention, a sensor having a hysteresis property in which the switching (changing) point of the output differs according to the moving direction is used as the home position sensor 16 to detect active (effective) and inactive (ineffective) positions. The original position of the carriage is then detected when the output of the sensor switches (changes) to be active (effective) from being inactive (ineffective) while the carriage moves in the reverse direction.

According to an example of the present invention, the position of the carriage with respect to the switching (changing) point of the output of the home position sensor 16 is firstly recognized based on whether or not the output of the home position sensor 16 is inactive (ineffective). The moving direction of the carriage is determined according to the recognized position of the carriage. Therefore, the carriage reaches the switching (changing) point of the output of the home position sensor 16 by moving in the shortest distance wherever the carriage is positioned and performs a temporary homing operation there. In the temporary homing operation, the tentative original position of the scanner for performing the scanning operation is detected when the output of the home position sensor 16 switches (changes) to be inactive (ineffective) while the carriage moves in the forward direction. Therefore, when the carriage is located at the positions shown in FIGS. 5 or 6, the temporary homing operation is performed while the carriage moves in the forward direction as determined according to the recognized position of the carriage. However, when the carriage is located at the position shown in FIG. 4, the carriage firstly moves in the reverse direction, and then moves in the forward direction when the output of the home position sensor 16 switches (changes) to be active (effective).

In the above-described temporary homing operations, the least period of time is required for detecting the tentative original position when the carriage is located at the position shown in FIG. 5, however, a similar period of time is required when the carriage is located at the positions shown in FIG. 4 or FIG. 6. That is, according to the example shown in FIG. 4, the extra time required in the example shown in FIG. 16 is not required. Conventionally, the original position of the scanner is determined when the output of the home position sensor switches (changes) to be active (effective) from being inactive (ineffective) while the carriage moves from the white plate side to the home position sensor side. The original position of the scanner is detected when the power switch is turned on or when the return operation from the shutdown state is performed. At power-on time, the carriage unconditionally moves in the forward direction toward the white plate until the carriage reaches the position where the output of the HPS is inactive (ineffective) before performing the operation to detect the original position of the carriage (i.e., homing operation). Thus, the time required to detect the original position of the carriage is shortened compared with the background art even when the position of the carriage is shifted to the side of the white plate 13 with respect to the switching (changing) point of the home position sensor 16 at power-on time.

Conventionally, the carriage moves to the original position of the carriage to be in the standby state after the automatic adjustment to the reading performance of the scanner is made. However, according to the example of the present invention, the carriage moves in the reverse direction from the position of the white plate 13 where the automatic adjustment to the reading performance of the scanner is performed. The original position of the scanner is detected when the output of the home position sensor 16 switches (changes) to be active (effective) from being inactive (ineffective) while moving in the reverse direction. The carriage further moves in the reverse direction for a predetermined distance to reach the standby position. That is, the carriage stays at the standby position where is within the detective range of the home position sensor 16. Therefore, the DPPC is put in the shutdown state while the carriage stays at the standby position. The output of the home position sensor 16 is active (effective) when the return operation from the shutdown state is performed at power-on time. Thus, the optimum operations as described above i.e., (1) to move in the forward direction and detect the tentative original position of the carriage, (2) to make an automatic adjustment, and (3) to move in the reverse direction and detect the original position of the carriage, are performed.

Next, a second example of the present invention is described below. The second example relates to an initializing process suited to when the DPPC is put in the shutdown state. In the shutdown state, the power supply is suspended when the shutdown condition is satisfied e.g., when the power key (i.e., soft key) is depressed or when the DPPC is not operated for a predetermined period of time. In the above-described first example, it is assumed that the initializing process is started while the carriage is preferably in the active (effective) range of the output of the home position sensor 16 so that the example can be applied to both when the power switch is turned on and when the return operation from the shutdown state is performed. According to the second example, the time required to initialize the scanner is further reduced by reducing the distance that the carriage moves when the return operation from the shutdown state is performed. The position of the carriage in the shutdown state is regulated to the position of the white plate 13 where an automatic adjustment to the reading performance of the scanner is made. Thus, the initializing process of the scanner is performed in a short time when the return operation from the shutdown state is performed.

Therefore, the carriage has to move from the standby position where the output of the home position sensor 16 is active (effective) to the white plate range while the main body is put in the shutdown state from the standby state in order to regulate the position of the carriage to the position of the white plate 13 in the shutdown state.

Figure 7:
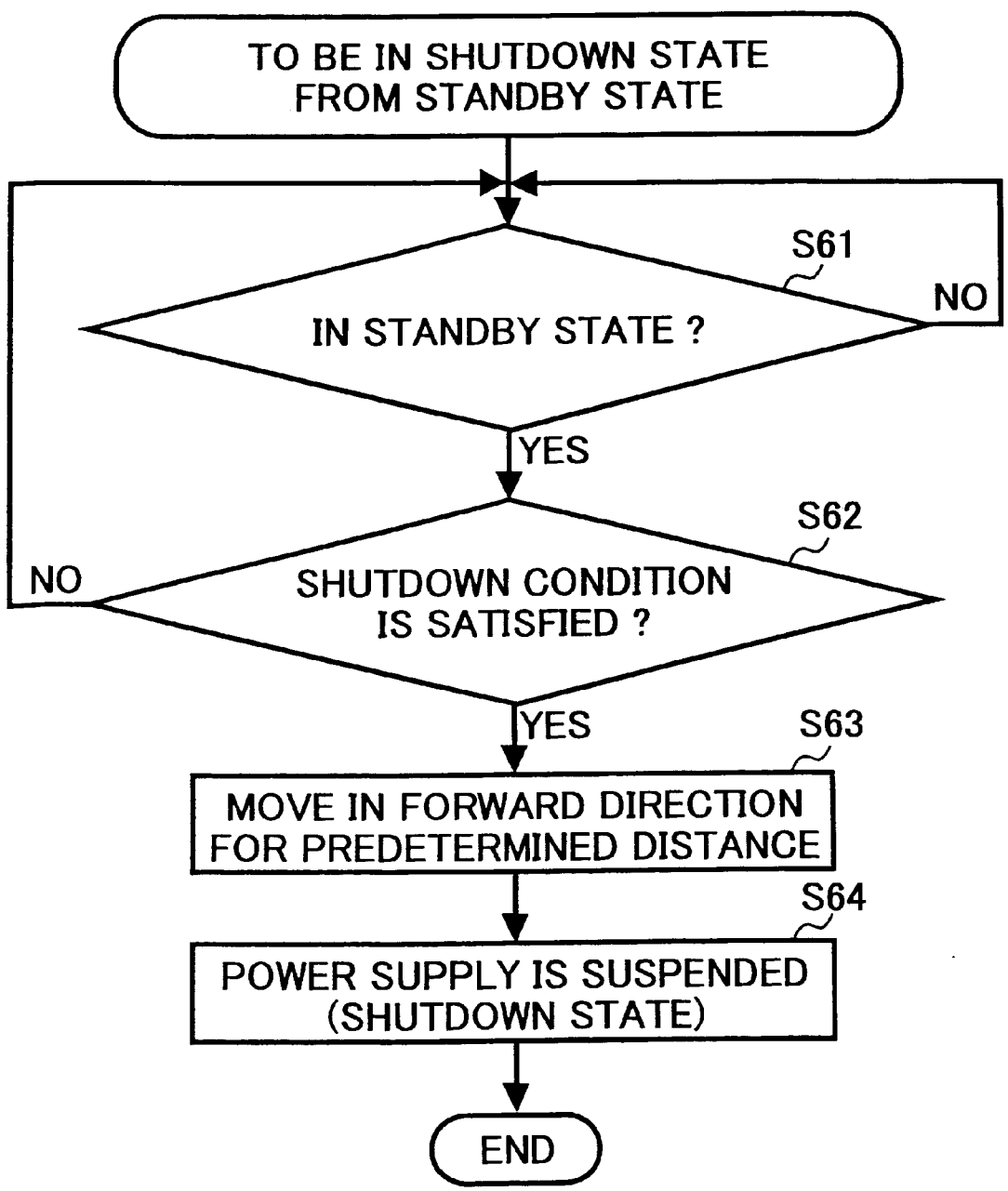
FIG. 7 is a flowchart illustrating the operation of the carriage when the main body of the DPPC is put in the shutdown state from the standby state.

FIG. 7 is a flowchart illustrating the operation of the carriage when the main body is put in the shutdown state from the standby state as described above. According to the processing steps in the flowchart, whether or not the main body is in the standby state is checked at step S61. When it is determined that the main body is not in the standby state (i.e., No at step S61), the process stops until the main body is put in the standby state. When it is determined that the main body is in the standby state (i.e., Yes at step S61), whether or not the condition for being in the shutdown state is satisfied is checked at step S62. The check made at step S62 includes whether or not the power key (i.e., soft key) is depressed, or the DPPC is not operated for the predetermined period of time, etc. When the shutdown condition is not satisfied (i.e., No at step S62), the process returns to step S61.

When the condition to be in the shutdown state is satisfied at step S62 (i.e., Yes at S62), the carriage moves in the forward direction for a predetermined distance at step S63 to the white plate range because the carriage is positioned where the output of the home position sensor 16 is active (effective) while the main body is in the standby state.

Then, the power supply is suspended to put the main body in the shutdown state at step S64. The process is then finished and the carriage remains in this state until an instruction for the return operation is provided.

Figure 8:
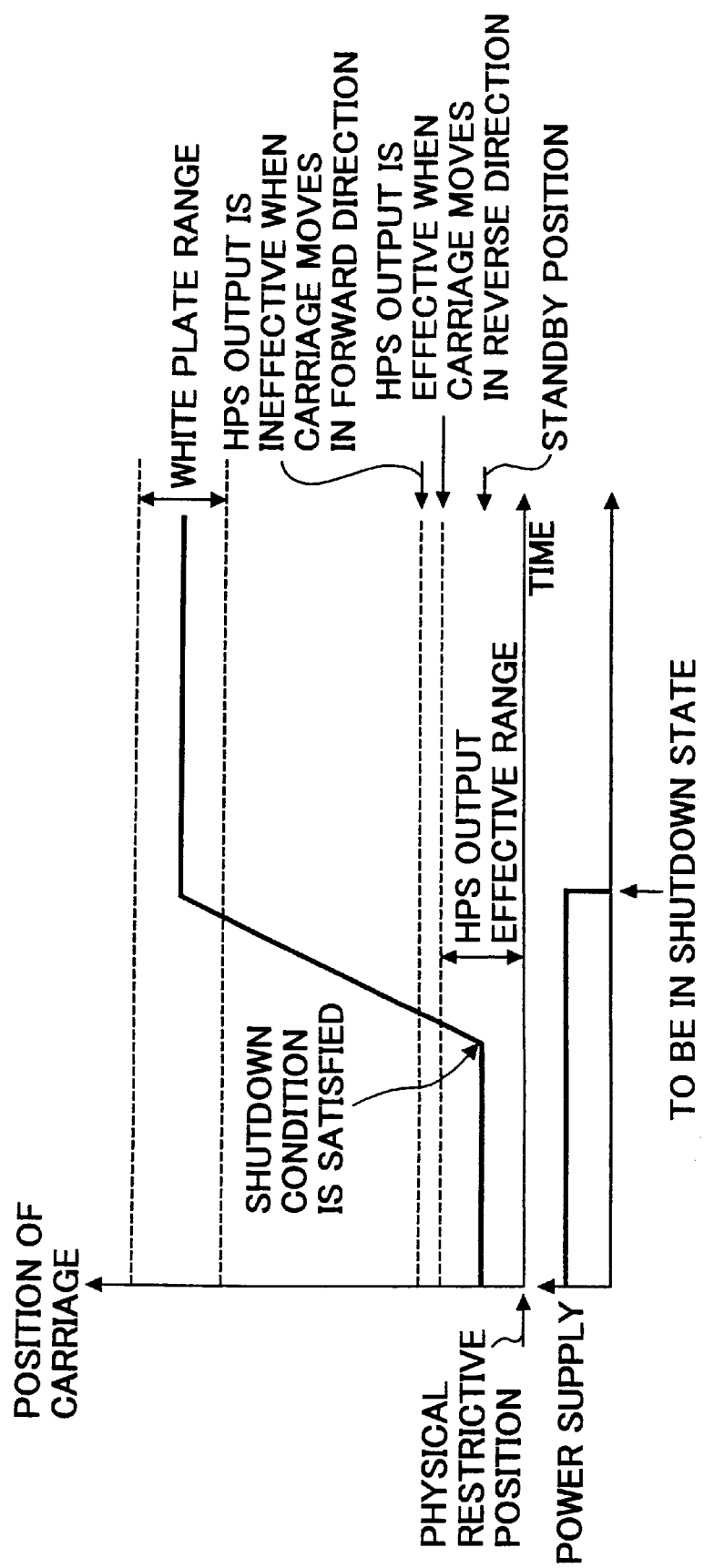
FIG. 8 is a flowchart showing the operation performed in FIG. 7.

The operation to be in the shutdown state performed according to the above-described processing steps in FIG. 7 is further explained referring to the timing diagram shown in FIG. 8 which shows the mutual relationship between the position of the carriage and the output of the home position sensor 16.

According to an example shown in FIG. 8, the carriage remains in the standby state in the range where the output of the home position sensor 16 is active (effective). The carriage moves in the forward direction when the condition to be in the shutdown state is satisfied. The carriage stops when it enters into the white plate range after the carriage moves for a predetermined distance. The main body is then put in the shutdown state, i.e., a power supply is suspended. The carriage remains at this position until an instruction for the return operation from the shutdown state is provided as long as a physical shock is not applied.

An initializing process according to an example of the present invention is described below referring to the flowchart in FIG. 9 which illustrates initializing process steps of the scanner when a return operation from the shutdown state is performed. According to the steps in the flowchart illustrated in FIG. 9, the carriage performs an optimum operation assuming that the carriage remains stopped in the white plate range based on the steps described in FIG. 7. Therefore, whether or not the image reading level of the scanner is within the proper range is checked. When the image reading level is within the proper range, the scanner makes an automatic adjustment to its image reading level. The original position of the carriage is then detected while the carriage moves to a position where the carriage is put in the standby state. According to the first example of the present invention, the carriage moves to the white plate range to read the white plate 13 because the carriage is generally positioned adjacent to the switching (changing) point of the output of the home position sensor 16. However, in the second example, the operation of the carriage to move to the white plate range is eliminated, thereby reducing the time required to initialize the scanner.

Figure 9B:
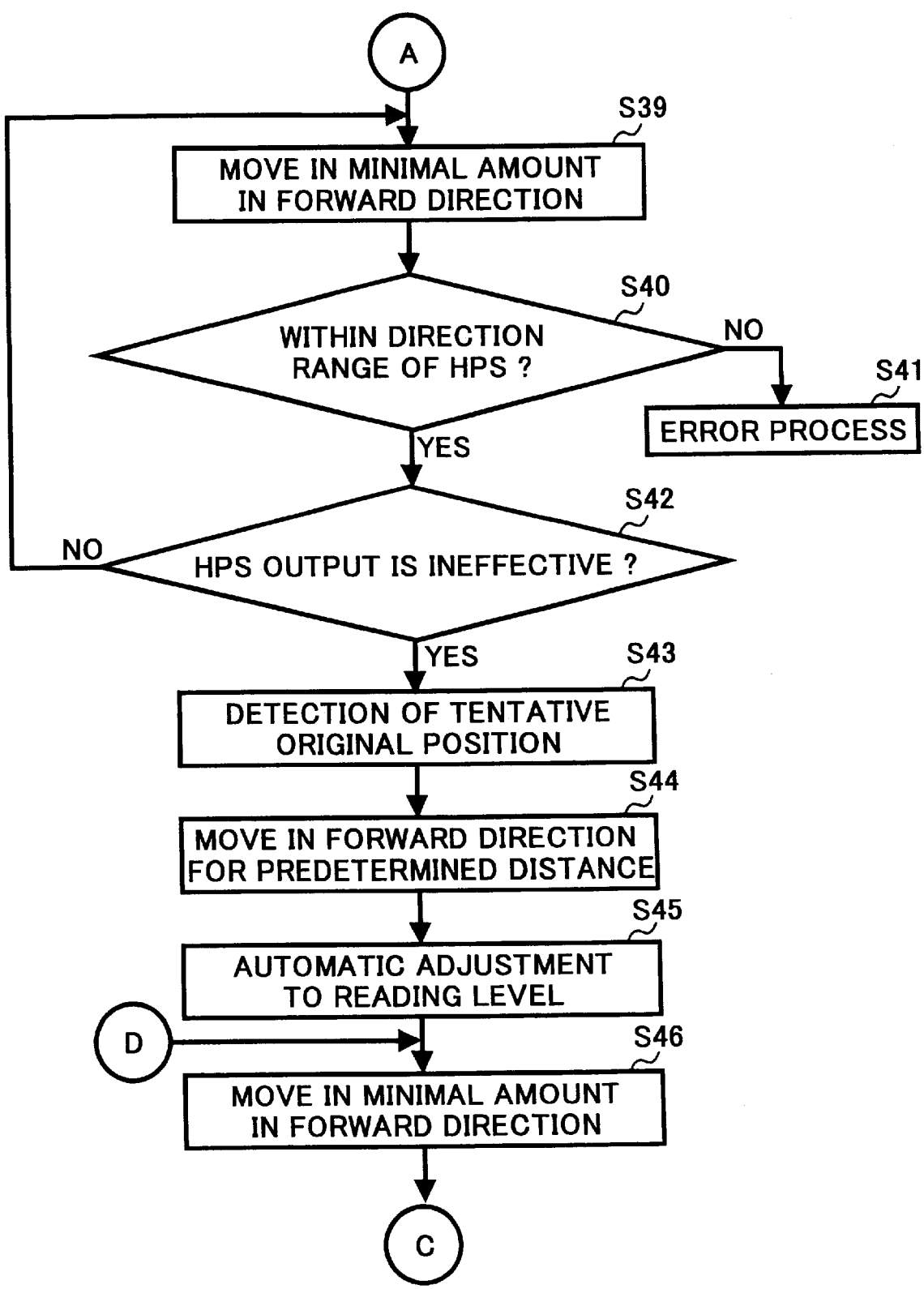
FIG. 9 is a flowchart showing the initializing operation performed when the return operation from the shutdown state is performed.
Figure 9C:
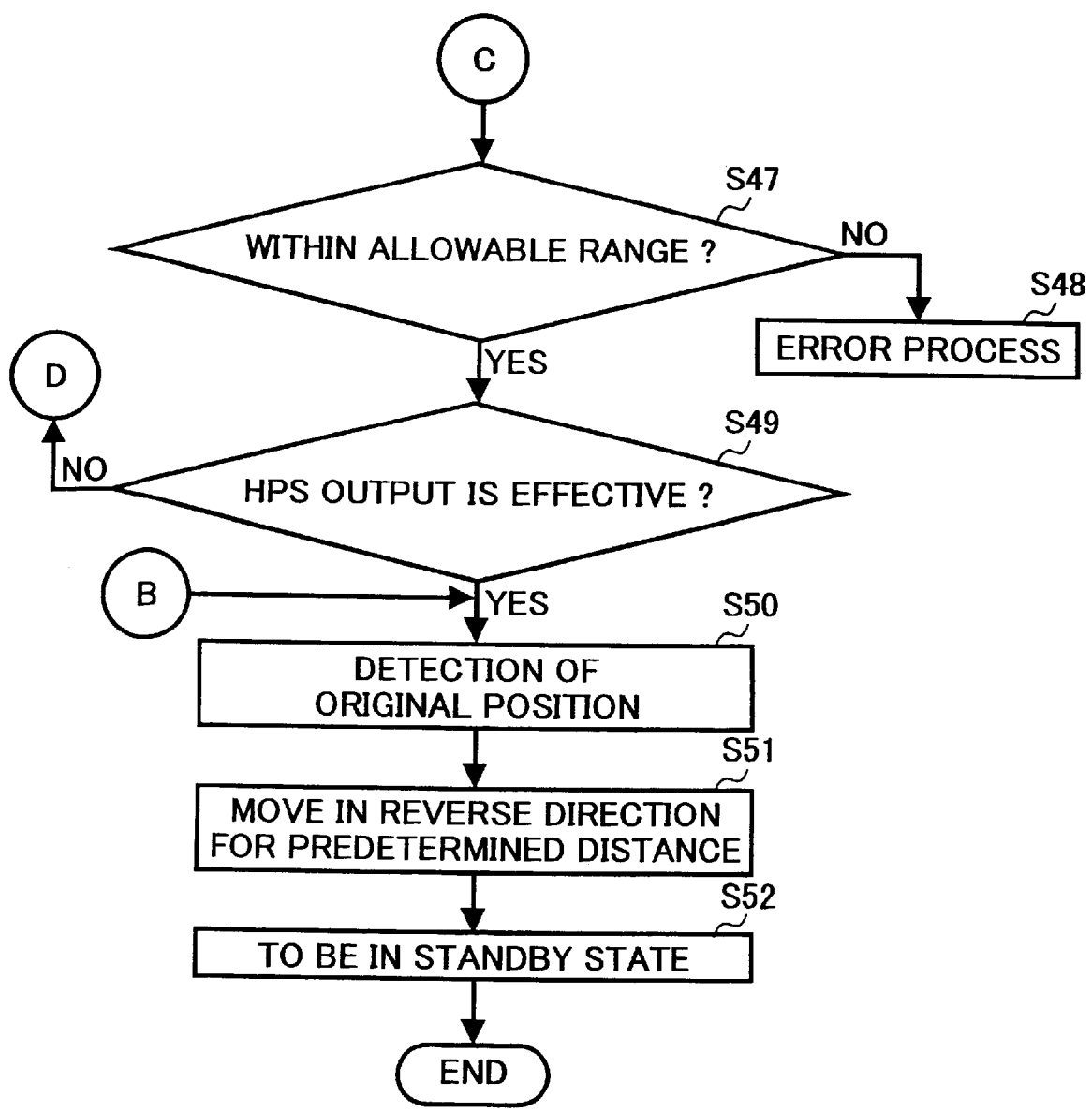

According to the steps in FIG. 9, whether or not the output of the home position sensor 16 is inactive (ineffective) is checked at step S31 in order to determine whether or not the carriage is positioned within the detection range of the home position sensor 16 when an instruction for a return operation from the shutdown state is provided. When it is determined that the output of the home position sensor 16 is not inactive (ineffective) (i.e., No at step S31), the process steps S32 through S37 (to be described below) are skipped and the process proceeds to step S38 (to be described below).

When the output of the home position sensor is inactive (ineffective) (i.e., Yes at step S31) i.e., the carriage is positioned on the side of the white plate 13 with respect to the switching (changing) point of the output of the home position sensor 16, whether or not the image reading level of the scanner is within the proper range is checked at step S32.

Whether or not the image reading level of the scanner is within the predetermined proper range is checked, for example, by judging whether or not the read image level of this time is within the proper range. The predetermined proper range is set based on the stored result of the automatic adjustment which was made last time. When the process steps shown in FIG. 7 are normally performed when the main body is put in the shutdown state from the standby state and the DPPC stays in the shutdown state, the level of the read image of this time is generally determined to be within the proper range. However, this check is made considering that an abnormal performance of the process steps may happen.

When the image reading level of the scanner is determined to be within the predetermined proper range at step S32, an automatic adjustment to the image reading level of the scanner is made at step S33. Then, whether or not the output of the home position sensor 16 switches (changes) to be active (effective) is checked at step S37 while moving the carriage a minimal amount in the reverse direction toward the switching (changing) point of the output of the home position sensor 16 at step S34. The processes at steps S34 through S37 are performed even when the image reading level of the scanner is determined not to be within the predetermined proper range at step S32. It is determined that the scanner malfunctions (i.e., No at S35) and error processes, for example, to stop the operation are performed at step S36 when the output of the home position sensor 16 does not switch (change) to be active (effective) even if the carriage is moved beyond the allowable range in the reverse direction at step S34.

When the output of the home position sensor 16 switches (changes) to be active (effective) at step S37, whether or not the traveled distance of the carriage (i.e., traveled distance from the position where the instruction for the return operation from the shutdown state is provided to the position where the output of the home position sensor 16 switches (changes) to be active (effective)) is within the predetermined range is determined at step S38. That is, it is determined whether or not the carriage was positioned at the place where the scanner can normally read the white plate 13 when the instruction for the return operation from the shutdown state is provided.

When it is determined that the carriage was properly positioned at step S38, the automatic adjustment made at step S33 is determined to be active (effective). The process then proceeds to step S50 (to be described below) by skipping the processes at steps S39 through S49 (to be described below).

When it is not determined that the carriage was properly positioned at step S38 (i.e., No at S38), the carriage moves to the white plate 13 to read it and returns to the current position.

Then, whether or not the output of the home position sensor 16 switches (changes) to be inactive (ineffective) is checked at step S42 while moving the carriage a minimal amount in the forward direction toward the white plate 13 at step S39. When the output of the home position sensor 16 switches (changes) to be inactive (ineffective) (i.e., Yes at step S42), the position of the scanner is detected at step S43 as the tentative original position for the scanning operation. When the output of the home position sensor 16 does not switch (change) to be inactive (ineffective) (i.e., No at step S40) even if the carriage moves for the predetermined distance at step S39, it is determined that the scanner malfunctions and error processes, for example, to stop the operation are performed at step S41. When the output of the home position sensor 16 does not switch (change) to be inactive (ineffective) at step S42 (i.e., No at step S42), the process returns to step S39 to further move the carriage in a minimal amount in the forward direction. The carriage moves in the forward direction for a predetermined distance at step S44 from the tentative original position detected at step S43 to reach the position where the white plate 13 is read. An automatic adjustment to the reading performance of the scanner is made at step S45 based on the read value of the white plate 13.

When the adjustment is completed, the carriage moves to the standby position (i.e., the position where the scanner is put in the standby state until an instruction for reading the original document is provided). An original position, which is used when controlling the position of the carriage for reading the original document, is detected while the carriage is moved to the standby position. As the process step for detecting the original position, whether or not the output of the home position sensor 16 switches (changes) to be active (effective) is checked at step S49 while moving the carriage in a minimal amount in the reverse direction toward the switching (changing) point of the output of the home position sensor 16 at step S46. When the output of the home position sensor 16 switches (changes) to be active (effective), the position of the scanner is detected as the original position at step S50. When the output of the home position sensor 16 does not switch (change) to be active (effective) (i.e., No at step S47) even if the carriage is moved in the reverse direction within an allowable range at step S46, it is determined that the scanner malfunctions and error processes, for example, to stop the operation are performed at step S48.

When the output of the home position sensor 16 switches (changes) to be active (effective) at steps S37 and S49, the original position is detected. After the original position is detected, the carriage moves in the reverse direction for a predetermined distance at step S51 from the original position to reach the position where the scanner is put in the standby state at step S52. The process is then finished.

The initializing process operation performed according to the above-described processing steps is further described referring to timing diagrams in FIGS. 10 through 13 which show the mutual relationship between the position of the carriage and the output of the home position sensor 16.

Figure 11:
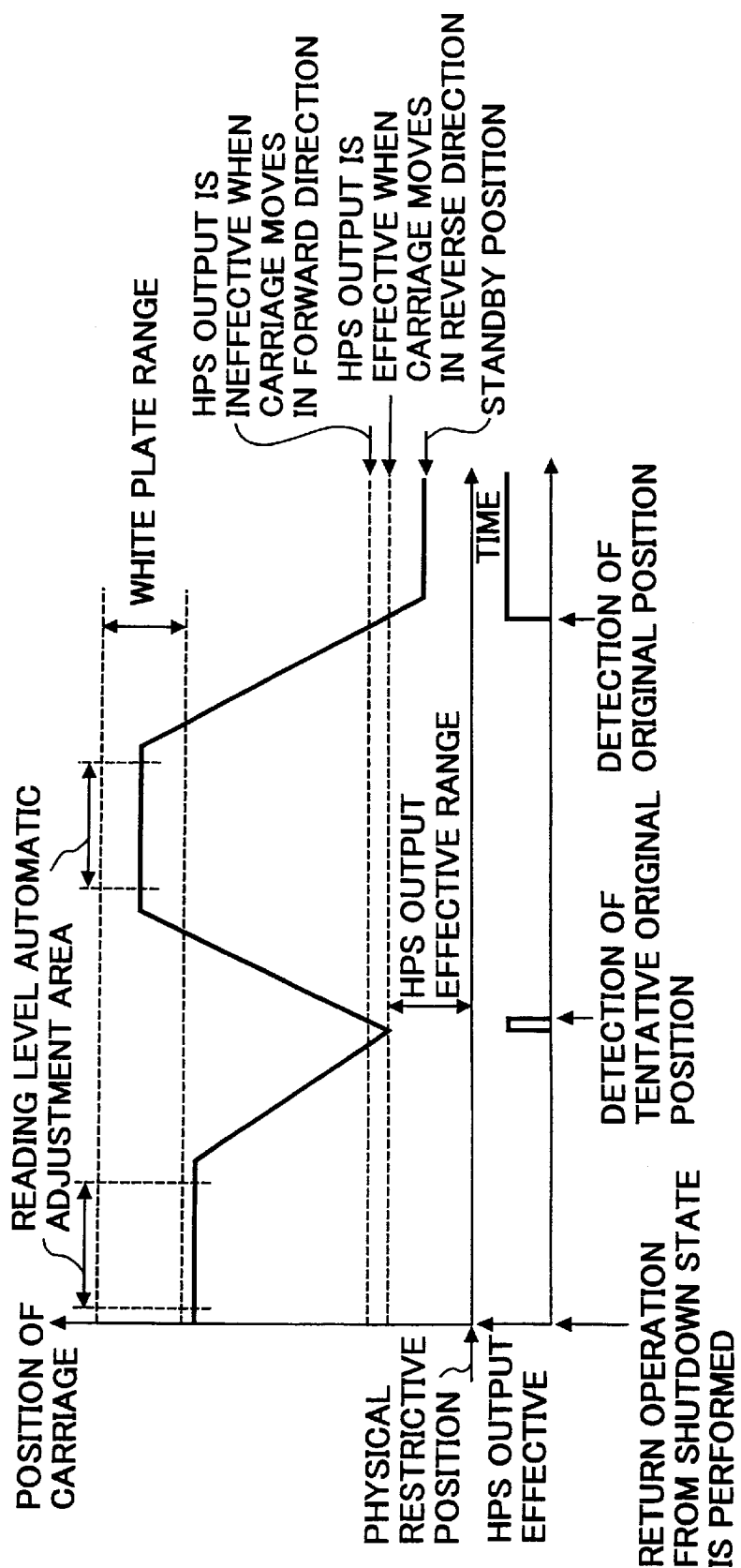
FIG. 11 is a timing diagram showing the operation of the carriage when the position of the carriage is slightly shifted to the side of the switching (changing) point of the output of the home Position sensor with respect to the white plate.
Figure 12:
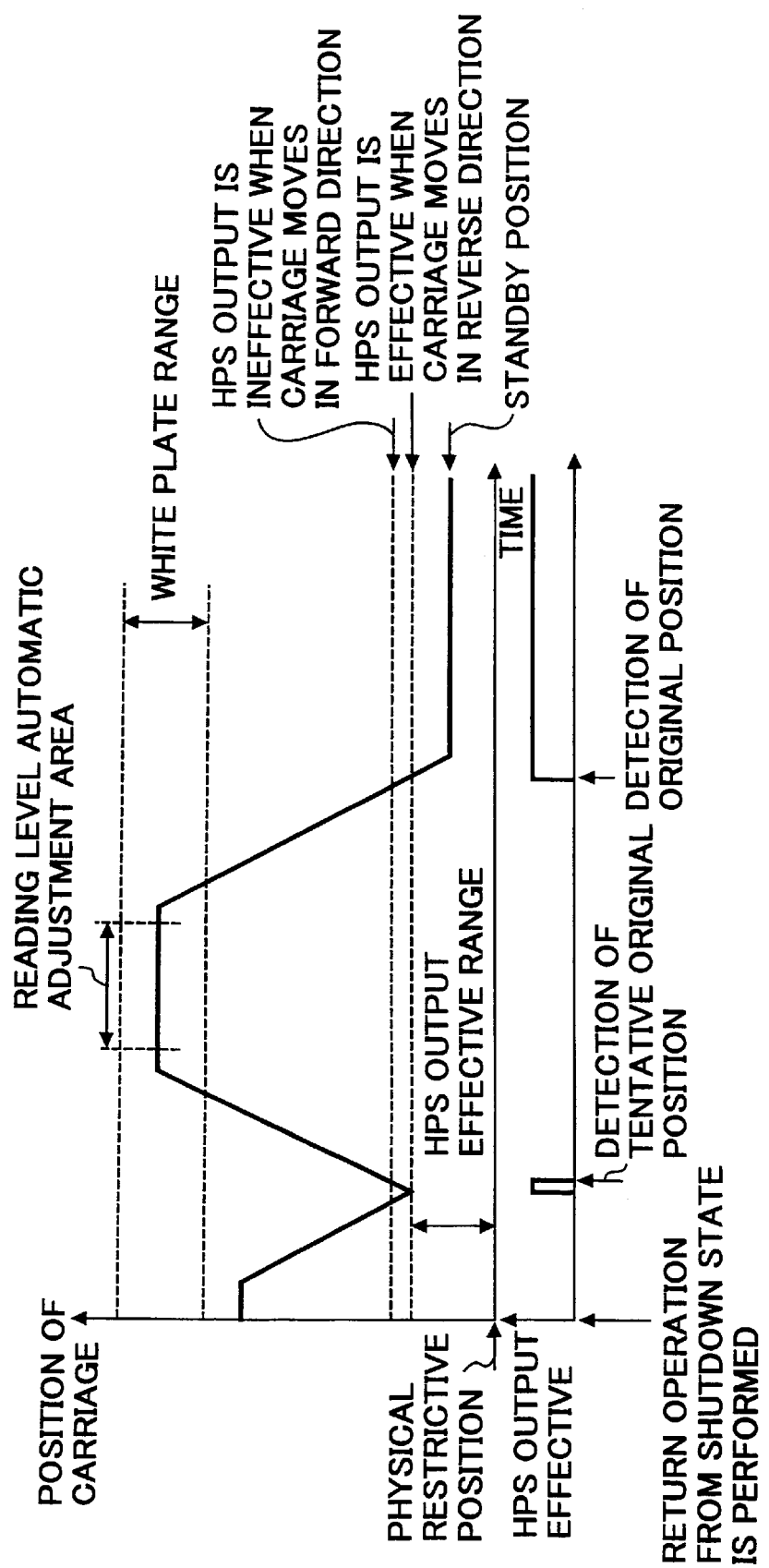
FIG. 12 is a timing diagram showing the operation of the carriage when the carriage is positioned outside the white plate range.

The timing diagrams in FIGS. 10 through 13 illustrate that the carriage is located in a different position (i.e., a different shutdown position) when an instruction for the return operation from the shutdown state is provided. In FIG. 10, the carriage is positioned in the white plate range (thus, the output of the home position sensor 16 is inactive (ineffective), the image reading level of the scanner is within the proper range, and the shutdown position with respect to the original position is proper). In FIG. 11, the position of the carriage is slightly shifted to the side of the switching (changing) point of the output of the home position sensor 16 with respect to the white plate 13 (thus, the output of the home position sensor 16 is inactive (ineffective), the image reading level of the scanner is within the proper range, however, the shutdown position with respect to the original position is not proper). In FIG. 12, the position of the carriage is further shifted to the side of the switching (changing) point of the output of the home position sensor 16 with respect to the white plate 13 (thus, the output of the home position sensor 16 is inactive (ineffective), the image reading level of the scanner is not within the proper range, the shutdown position with respect to the original position is not proper).

Figure 13:
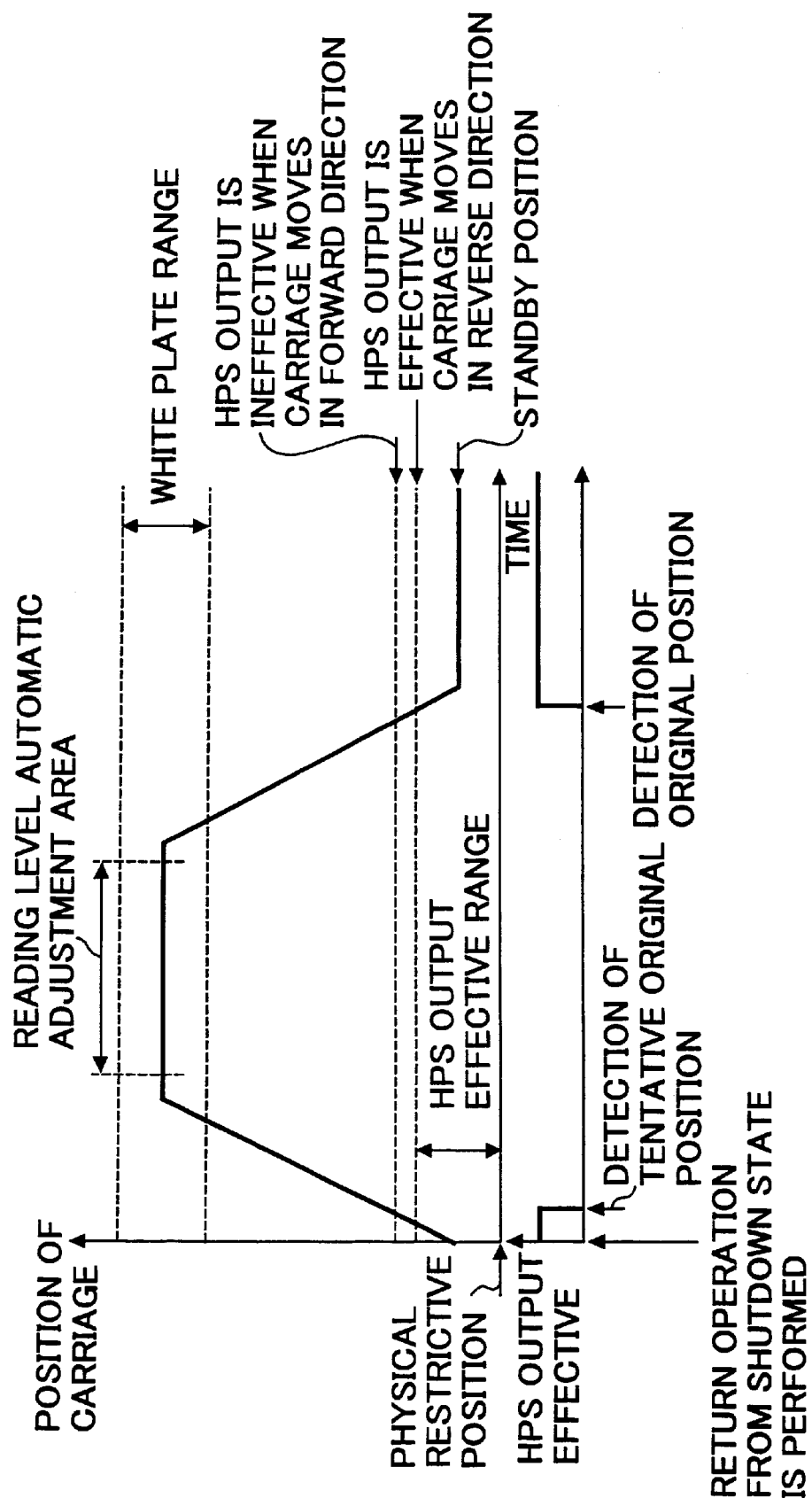
FIG. 13 is a timing diagram showing the operation of the carriage when the position of the carriage is shifted to the side of the physical restrictive position with respect to the output of the home position sensor.
Figure 14:
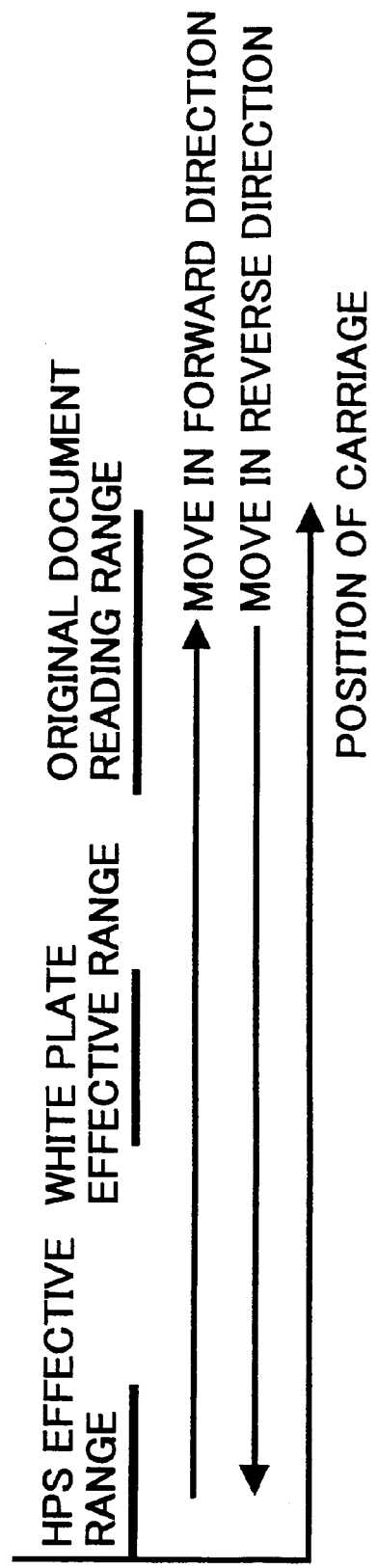
FIG. 14 illustrates three ranges (i.e., HPS active (effective) range, white plate active (effective) range, original document reading range) provided in order along the track of the carriage.
Figure 15A:
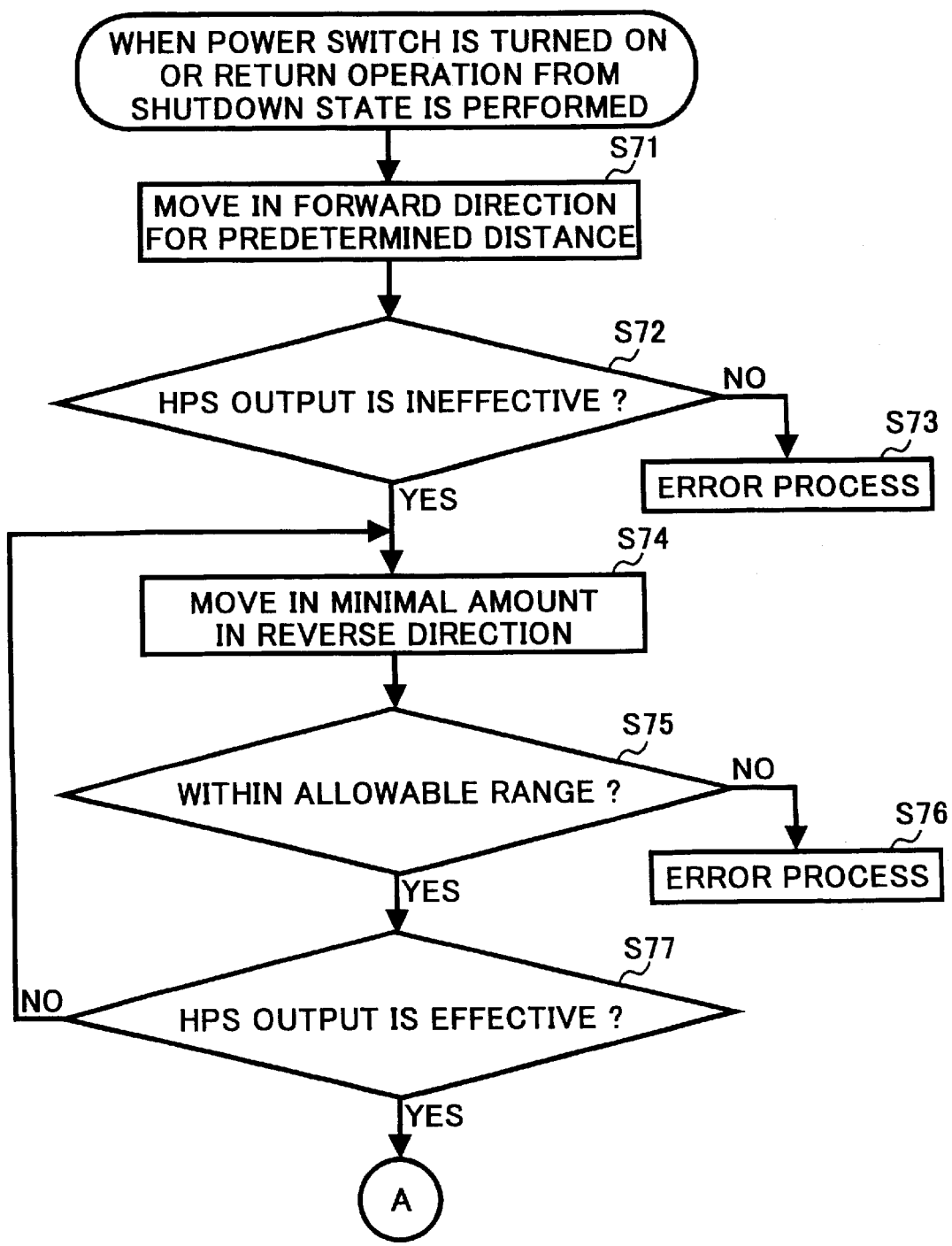
FIG. 15 is a flowchart showing a conventional initializing operation performed when the power switch is turned on or when a return operation from the shutdown state is performed.
Figure 17:
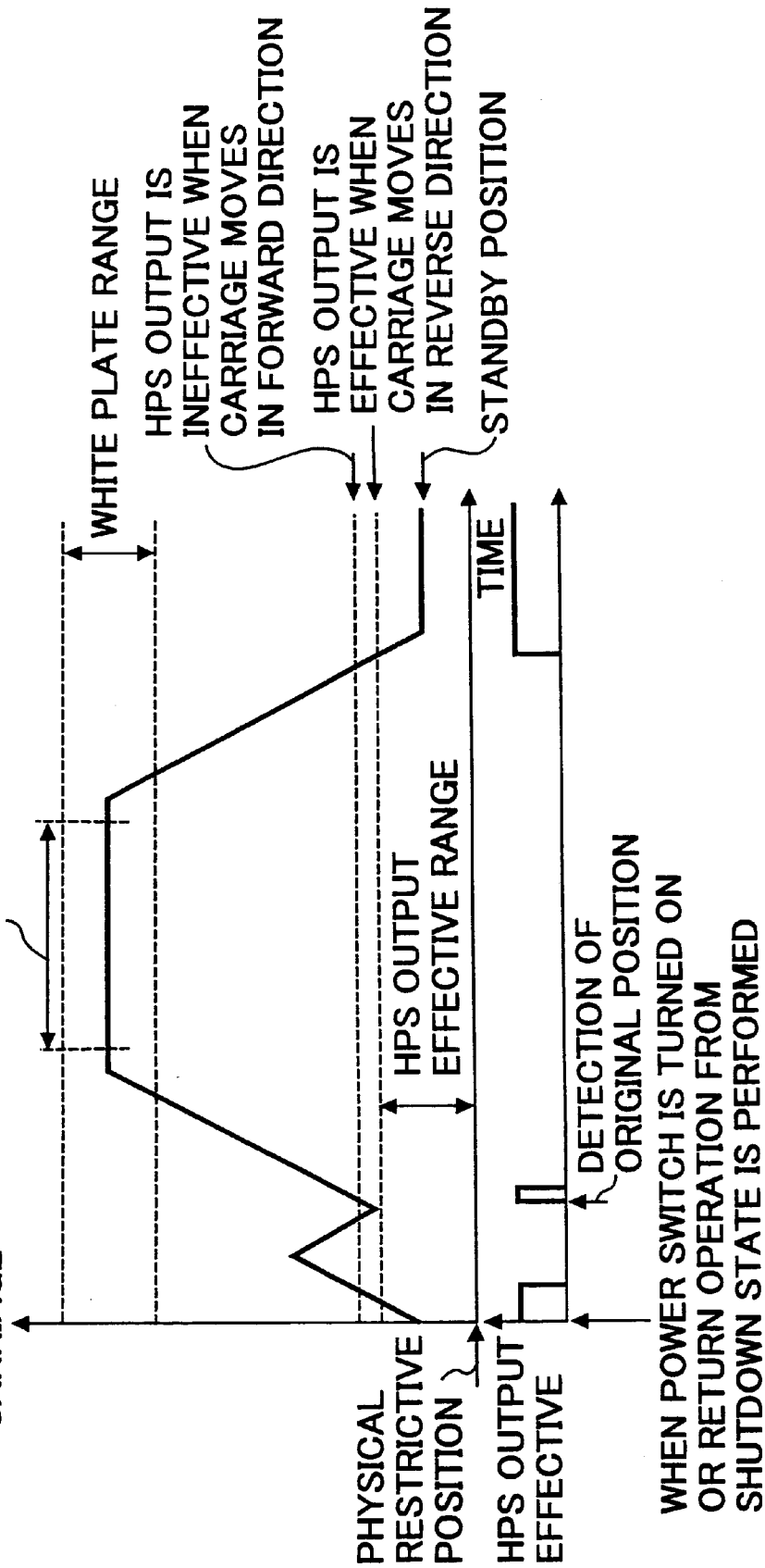
FIG. 17 is a timing diagram showing the operation of the initializing process performed in FIG. 15 when the carriage is positioned close to the switching (changing) point of the output of the home position sensor.
Figure 18:
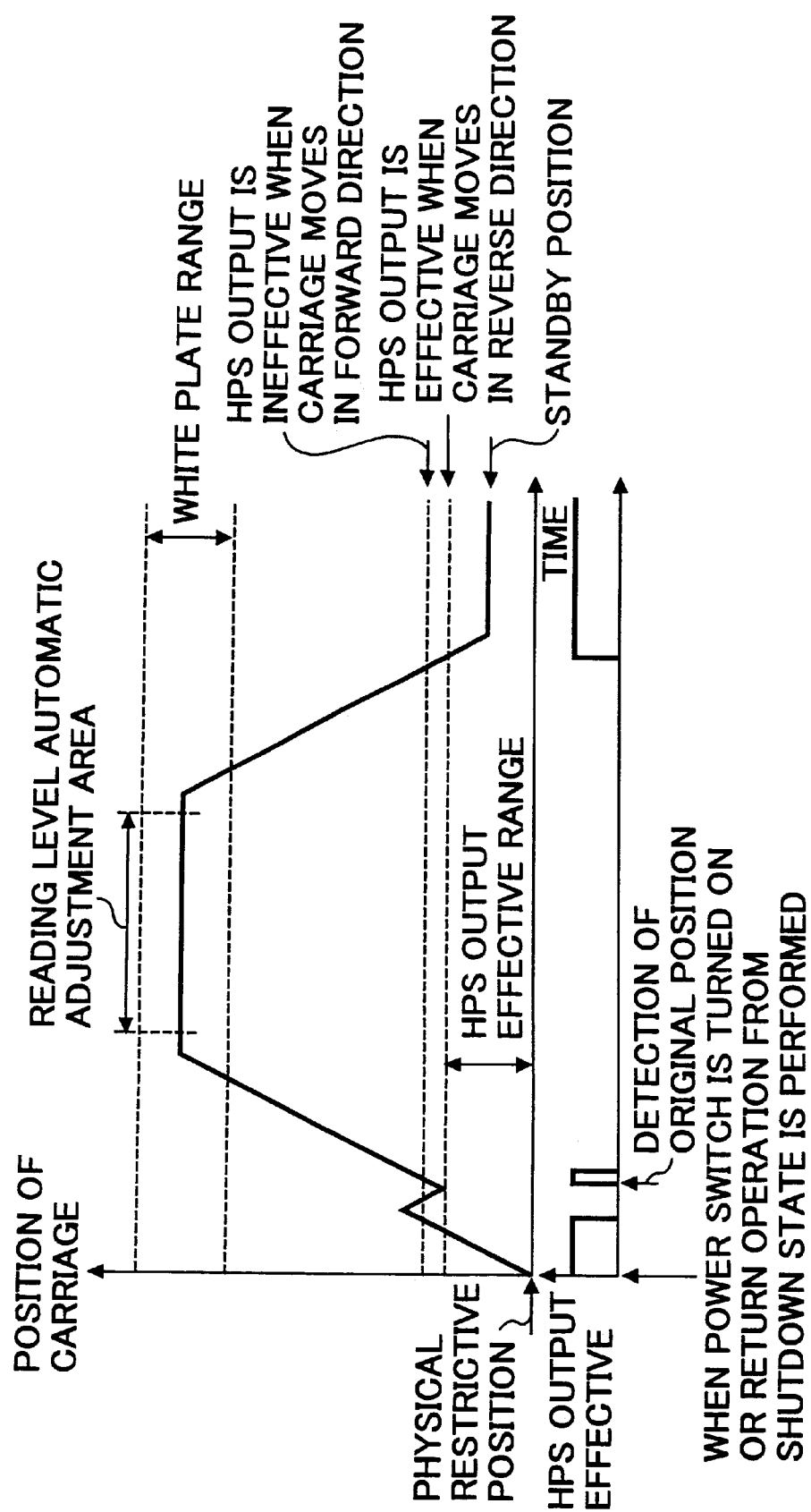
FIG. 18 is a timing diagram showing the operation of the initializing process performed in FIG. 15 when the position of the carriage is shifted to the side of the physical restrictive position with respect to the switching (changing) point of the output of the home position sensor.

In FIG. 13, the position of the carriage is shifted to the side of the physical restrictive position with respect to the switching (changing) point of the output of the home position sensor 16 (thus, the output of the home position sensor 16 is active (effective), the image reading level of the scanner is not within the proper range, the shutdown position with respect to the original position is not proper). According to these examples of the present invention, a sensor having a hysteresis property in which the switching (changing) point of the output differs according to the moving direction is used as the home position sensor 16. The original position of the carriage is then detected when the output of the home position sensor 16 switches (changes) to be active (effective) from being inactive (ineffective) while the carriage moves in the reverse direction.

According to these examples, whether or not the output of the home position sensor 16 is inactive (ineffective) is checked at first to distinguish the shutdown position of the carriage shown in FIG. 13 from the positions shown in FIGS. 10 through 12. According to the example shown in FIG. 13, the carriage moves to the white plate 13 to read it when the return operation from the shutdown state is started. The carriage moves to the standby position after an automatic adjustment to the image reading level of the scanner is completed. The original position of the scanner is detected while the carriage moves to the standby position.

Next, whether or not the image reading level of the scanner is within a proper range even though the output of the home position sensor 16 is inactive (ineffective) is checked to distinguish the shutdown position of the carriage shown in FIG. 12 from the positions shown in FIGS. 10 and 11. According to the example shown in FIG. 12, the tentative original position of the scanner is detected immediately after the image reading level of the scanner is determined not to be within the proper range. Thereafter, the carriage moves to the standby position after the same operations as performed in FIG. 13 are performed.

Further, whether or not the traveled distance of the carriage from the shutdown position to the position where the output of the home position sensor 16 switches (changes) to be active (effective) is within a predetermined range is checked to distinguish the shutdown position of the carriage shown in FIG. 11 from the position shown in FIG. 10. When the carriage is at the shutdown position shown in FIG. 11, the output of the home position sensor 16 is inactive (ineffective) and the image reading level of the scanner is within the proper range, however, the shutdown position with respect to the original position of the scanner is not proper. That is, there is the possibility that a proper automatic adjustment to the image reading level of the scanner may not be made because the shutdown position is slightly shifted to the side of the switching (changing) point of the output of the home position sensor 16 with respect to the white plate 13. According to an example shown in FIG. 11, the automatic adjustment to the reading level of the scanner is made immediately after the return operation from the shutdown state is started. When the shutdown position of the carriage is not proper with respect to the original position (as a result, it will be a tentative original position), the automatic adjustment to the reading level of the scanner is made again. Thereafter, the carriage moves to the standby position after the same operations as performed in FIGS. 12 and 13 are performed.

In the example shown in FIG. 10, the output of the home position sensor 16 is inactive (ineffective), the image reading level of the scanner is within the proper range, and the shutdown position of the carriage is proper with respect to the original position. That is, the carriage remains in the white plate range according to the shutdown process steps shown in FIG. 7. As illustrated in FIG. 10, the automatic adjustment to the image reading level of the scanner is immediately made when the return operation from the shutdown state is started. Because the shutdown position of the carriage is proved to be proper when the shutdown position is checked while the carriage moves to the standby position, the original position of the scanner is detected. Thereafter, the carriage performs an operation to move to the standby position. When the optimum operation as described above is performed, the operation performed in the first example is eliminated i.e., the operation in which the carriage moves to the white plate range to read the white plate 13 which is performed in the first example because the carriage is generally positioned adjacent to the switching (changing) point of the output of the home position sensor 16. Thus, the time required to initialize the scanner is reduced when the return operation from the shutdown state is performed.

In the above-described examples of the present invention, a sensor having a hysteresis property in which the switching (changing) point of the output differs according to the moving direction is used as the home position sensor 16, a sensor that does not have the hysteresis property, i.e., the switching (changing) point of the output does not differ according to the moving direction may be used. When the sensor that does not have the hysteresis property is used, the process steps shown in FIGS. 3 and 9 are basically performed.

However, the operation to reverse the moving direction of the carriage is performed when the output of the home position sensor 16 switches (changes) to be active (effective) from being inactive (ineffective) while the sensor without the hysteresis property is used as the home position sensor 16, the carriage reverses its moving direction approximately at the same position identified as the tentative original position. Therefore, the setting of the operational condition is to be changed to perform the appropriate operation. The above-described operation to reverse the moving direction of the carriage is performed between the instant when the output of the home position sensor 16 switches (changes) to be active (effective) at step S15 thus the carriage reverses its moving direction and the instant when the output of the home position sensor 16 switches (changes) to be inactive (ineffective) at step S19 in FIG. 3.

Further, in FIG. 9, the operation is performed between the instant when the output of the home position sensor 16 switches (changes) to be active (effective) at step S37 thus the carriage reverses its moving direction and the instant when the output of the home position sensor 16 switches (changes) to be inactive (ineffective) at step S42.

In addition, the operation can be performed by preparing and using a program in which the procedures of the initializing process described as examples of the present invention, such as the homing operation, the adjustment of the output level of the reading section, etc., performed by the control section of the main body of the DPPC, is written. The program can be recorded in a commonly known computer-readable recording media. The recording media is used under the control of the control section of the main body of the DPPC, or the program can be installed into a memory device so as to perform the initializing process by reading the program.

Numerous additional modifications and variations of the present invention are possible in light of the above teachings. It is therefore to be understood that within the scope of the appended claims, the present invention may be practiced otherwise than as specifically described herein.

This document claims priority and contains subject matter related to Japanese Patent Application No. 2000-232198, filed on Jul. 31, 2000 and Japanese Patent Application No. 2001-179562, filed on Jun. 14, 2001, and the entire contents thereof are herein incorporated by reference.

What is claimed as new and is desired to be secured by Letters Patent of the United States is:

1. An image processing apparatus, comprising:
   a carriage configured to carry an image reading device;
   a white plate configured to be read by the image reading device for adjusting a reading level of the image reading device, said white plate being arranged above a track of said carriage;
   a home position sensor configured to detect a position of said carriage;
   a controller configured to control a movement of said carriage, said controller moving said carriage based on an output of said home position sensor to perform an initializing process of the image reading device including a homing operation and a white plate reading operation,
   wherein said controller is configured to (1) determine a direction of the movement of said carriage based on the output of said home position sensor when the initializing process is initiated, (2) perform a tentative homing operation of the image reading device when said home position sensor changes the output after said carriage is moved, and (3) move said carriage to a white plate reading position based on the performance of the tentative homing operation.

2. The image processing apparatus according to claim 1, wherein said controller is configured to move said carriage to the direction in which the output of said home position sensor changes after the white plate reading operation is completed so as to perform the homing operation when the output of said home position sensor changes.

3. An image processing apparatus, comprising:
   a carriage configured to carry an image reading device;
   a white plate configured to be read by the image reading device for adjusting a reading level of the image reading device, said white plate being arranged above a track of said carriage;
   a home position sensor configured to detect a position of said carriage;
   a controller configured to control a movement of said carriage, said controller moving said carriage based on an output of said home position sensor to perform an initializing process of the image reading device including a homing operation and a white plate reading operation,
   wherein said controller is configured to (1) determine whether or not an output level of the image reading device is within a proper range when the initializing process is initiated, (2) move said carriage to a direction in which the output of said home position sensor changes after the white plate reading operation is completed when the output level of the image reading device is within a proper range, and (3) perform the homing operation when the output of said home position sensor changes.

4. The image processing apparatus according to claim 3, wherein said controller is configured to (1) move said carriage to the direction in which the output of said home position sensor changes in a case where the output of the image reading device is not within the proper range when the initializing process is initiated, (2) perform a tentative homing operation when the output of said home position sensor changes, (3) moves said carriage to a position where said white plate is read based on the tentative homing operation, (4) reverse the moving direction of said carriage to a direction in which the output of said home position sensor changes after the white plate reading operation is completed, and (5) perform the homing operation when the output of said home position sensor changes.

5. The image processing apparatus according to claim 3, wherein said controller is configured to (1) move said carriage to the direction in which the output of said home position sensor changes after the white plate reading operation is completed in a case where the output of the image reading device is within the proper range when the initializing process is initiated, (2) perform a tentative homing operation when the output of said home position sensor changes in a case where the output of said home position sensor changes while said carriage moves within an allowable range, (3) moves said carriage to a position where said white plate is read based on the tentative homing operation, (4) move said carriage to the direction in which the output of said home position sensor changes after the white plate reading operation is completed, and (5) perform the homing operation when the output of said home position sensor changes.

6. The image processing apparatus according to claim 3, wherein said controller is configured to move said carriage to a position where said white plate is read when the apparatus is put in a shutdown state.

7. An image processing apparatus, comprising:
   a carriage configured to carry an image reading device;
   a white plate configured to be read by the image reading device for adjusting a reading level of the image reading device, said white plate being arranged above a track of said carriage;
   a home position sensor configured to detect a position of said carriage;
   a controller configured to control a movement of said carriage, said controller moving said carriage based on an output of said home position sensor to perform an initializing process of the image reading device including a homing operation and a white plate reading operation,
   wherein said controller is configured to perform (1) the operation recited in claim 2 when a power switch is turned on and (2) the operation recited in claim 6 when a return operation from a shutdown state is performed.

8. The image processing apparatus according to claim 1, wherein said home position sensor includes a sensor configured to have a property in which an output changes according to a moving direction, and wherein said controller is configured to reverse the moving direction of said carriage when the output of said home position sensor changes while said carriage moves away from said white plate in a case where said carriage performs an operation in which said carriage moves from a side of said white plate to the position where the output of said home position sensor changes and reverses the moving direction at this position.

9. The image processing apparatus according to claim 7, wherein said home position sensor includes a sensor configured to have a property in which an output changes according to a moving direction, and wherein said controller is configured to reverse the moving direction of said carriage when the output of said home position sensor changes while said carriage moves away from said white plate in a case where said carriage performs an operation in which said carriage moves from a side of said white plate to the position where the output of said home position sensor changes and reverses the moving direction at this position.

10. The image processing apparatus according to claim 1, wherein said home position sensor includes a sensor configured to have a property in which an output changes according to a moving direction, and wherein said controller is configured to perform the tentative homing operation when the output of said home position sensor changes while the carriage moves to said white plate.

11. The image processing apparatus according to claim 4, wherein said home position sensor includes a sensor configured to have a property in which an output changes according to a moving direction, and wherein said controller is configured to perform a tentative homing operation when the output of said home position sensor changes while the carriage moves to said white plate.

12. The image processing apparatus according to claim 7, wherein said home position sensor includes a sensor configured to have a property in which an output changes according to a moving direction, and wherein said controller is configured to perform a tentative homing operation when the output of said home position sensor changes while the carriage moves toward said white plate.

13. The image processing apparatus according to claim 1, wherein said controller is configured to move said carriage to one of directions in which said carriage moves from said white plate to a position where the output of said home position sensor changes and in which said carriage moves from the position where the output of said home position sensor changes to said white plate, and wherein said controller is configured to stop an operation of said carriage when the output of said home position sensor does not change even if said carriage moves within an allowable range.

14. The image processing apparatus according to claim 3, wherein said controller is configured to move said carriage to one of directions in which said carriage moves from said white plate to a position where the output of said home position sensor changes and in which said carriage moves from the position where the output of said home position sensor changes to said white plate, and wherein said controller is configured to stop an operation of said carriage when the output of said home position sensor does not change even if said carriage moves within an allowable range.

15. The image processing apparatus according to claim 7, wherein said controller is configured to move said carriage to one of directions in which said carriage moves from said white plate to a position where the output of said home position sensor changes and in which said carriage moves from the position where the output of said home position sensor changes to said white plate, and wherein said controller is configured to stop an operation of said carriage when the output of said home position sensor does not change even if said carriage moves within an allowable range.

16. A method for initializing an image processing apparatus having a carriage configured to carry an image reading device, a white plate arranged above a track of the carriage and configured to be read by the image reading device for adjusting a reading level of the image reading device, a home position sensor configured to detect a position of the carriage, and a controller configured to control a movement of the carriage, the method comprising:

determining a direction of the movement of the carriage in which an output of said home position sensor changes based on the output of the home position sensor when an initializing process is initiated;

performing a tentative homing operation of the image reading device when the home position sensor changes the output after the carriage is moved; and moving the carriage to a white plate reading position based on the performance of the tentative homing operation.

17. The method according to claim 16, further comprising:

moving the carriage to the direction in which the output of the home position sensor changes after the white plate reading operation is completed; and performing the homing operation when the output of the home position sensor changes.

18. A method for initializing an image processing apparatus having a carriage configured to carry an image reading device, a white plate arranged above a track of the carriage and configured to be read by the image reading device for adjusting a reading level of the image reading device, a home position sensor configured to detect a position of the carriage, and a controller configured to control a movement of the carriage, the method comprising:

determining whether or not an output level of the image reading device is within a proper range when an initializing process is initiated;

moving the carriage to a direction in which the output of the home position sensor changes after a white plate reading operation is completed when the output level of the image reading device is within a proper range; and performing a homing operation when the output of the home position sensor changes.

19. The method according to claim 18, further comprising:

moving the carriage to the direction in which the output of the home position sensor changes in a case where the output of the image reading device is not within the proper range when an initializing process is initiated;

performing a tentative homing operation when the output of the home position sensor changes;

moving the carriage to a position where the white plate is read based on the tentative homing operation;

moving the carriage to the direction in which the output of the home position sensor changes after the white plate reading operation is completed; and performing the homing operation when the output of the home position sensor changes.

20. The method according to claim 18, further comprising:

moving the carriage to the direction in which the output of the home position sensor changes after the white plate reading operation is completed in a case where the output of the image reading device is within the proper range when the initializing process is initiated;

performing a tentative homing operation when the output of the home position sensor changes in a case where the output of the home position sensor changes while the carriage moves within an allowable range;

moving the carriage to a position where said white plate is read based on the tentative homing operation;

moving the carriage to the direction in which the output of the home position sensor changes after the white plate reading operation is completed; and performing the homing operation when the output of the home position sensor changes.

21. The method according to claim 18, further comprising:

moving the carriage to a position where the white plate is read when the apparatus is put in a shutdown state.

22. A method for initializing an image processing apparatus having a carriage configured to carry an image reading device, a white plate arranged above a track of the carriage and configured to be read by the image reading device for adjusting a reading level of the image reading device, a home position sensor configured to detect a position of the carriage, and a controller configured to control a movement of the carriage, the method comprising:

(1) determining a direction of the movement of the carriage in which an output of said home position sensor changes based on the output of the home position sensor when an initializing process is initiated;

(2) performing a tentative homing operation of the image reading device when the home position sensor changes the output after the carriage is moved;

(3) moving the carriage to a white plate reading position based on the performance of the tentative homing operation;

(4) moving the carriage to the direction in which the output of the home position sensor changes after the white plate reading operation is completed in a case where the output of the image reading device is within the proper range when the initializing process is initiated;

(5) performing a tentative homing operation when the output of the home position sensor changes in a case where the output of the home position sensor changes while the carriage moves within an allowable range;

(6) moving the carriage to a position where said white plate is read based on the tentative homing operation;

(7) moving the carriage to the direction in which the output of the home position sensor changes after the white plate reading operation is completed; and (8) performing the homing operation when the output of the home position sensor changes;

wherein steps (1)–(3) are performed when a power switch is turned on; and wherein steps (4)–(8) are performed when a return operation from a shutdown state is performed.

23. The method according to claim 16, further comprising:

employing a sensor which has a property in which an output changes according to a moving direction as the home position sensor; and reversing the moving direction of the carriage when the output of the home position sensor changes while the carriage moves away from the white plate in a case where the carriage performs a operation in which the carriage moves from a side of the white plate to the position where the output of the home position sensor changes and reverses the moving direction at this position.

24. The method according to claim 19, further comprising:

employing a sensor which has a property in which an output changes according to a moving direction as the home position sensor; and reversing the moving direction of the carriage when the output of the home position sensor changes while the carriage moves away from the white plate in a case where the carriage performs a operation in which the carriage moves from a side of the white plate to the position where the output of the home position sensor changes and reverses the moving direction at this position.

25. The method according to claim 22, further comprising:

employing a sensor which has a property in which an output changes according to a moving direction as the home position sensor; and reversing the moving direction of the carriage when the output of the home position sensor changes while the carriage moves away from the white plate in a case where the carriage performs a operation in which the carriage moves from a side of the white plate to the position where the output of the home position sensor changes and reverses the moving direction at this position.

26. The method according to claim 16, further comprising:

employing a sensor which has a property in which an output changes according to a moving direction as the home position sensor; and performing the tentative homing operation when the output of the home position sensor changes while the carriage moves to the white plate.

27. The method according to claim 19, further comprising:

employing a sensor which has a property in which an output changes according to a moving direction as the home position sensor; and performing the tentative homing operation when the output of the home position sensor changes while the carriage moves to the white plate.

28. The method according to claim 22, further comprising:

employing a sensor which has a property in which an output changes according to a moving direction as the home position sensor; and performing a tentative homing operation when the output of the home position sensor changes while the carriage moves to the white plate.

29. The method according to claim 16, further comprising:

moving the carriage to one of directions in which the carriage moves from the white plate to a position where the output of the home position sensor changes and in which the carriage moves from the position where the output of the home position sensor changes to the white plate; and stopping an operation of the carriage when the output of the home position sensor does not change even if the carriage moves within an allowable range.

30. The method according to claim 18, further comprising:

moving the carriage to one of directions in which the carriage moves from the white plate to a position where the output of the home position sensor changes and in which the carriage moves from the position where the output of the home position sensor changes to the white plate; and stopping an operation of the carriage when the output of the home position sensor does not change even if the carriage moves within an allowable range.

31. The method according to claim 22, further comprising:

moving the carriage to one of directions in which the carriage moves from the white plate to a position where the output of the home position sensor changes and in which the carriage moves from the position where the output of the home position sensor changes to the white plate; and stopping an operation of the carriage when the output of the home position sensor does not change even if the carriage moves within an allowable range.

32. A computer program product configured to store plural computer program instructions which, when executed by a computer, cause the computer to perform the steps recited in any one of claims 16–31.

33. An image processing apparatus, comprising:

a carriage means for carrying an image reading device;

a white plate means for being read by the image reading device for adjusting a reading level of the image reading device, said white plate means being arranged above a track of said carriage means;

a home position sensor means for detecting a position of said carriage means;

a controller means for controlling a movement of said carriage means, said controller means moving said carriage means based on an output of said home position sensor means to perform an initializing process of the image reading device including a homing operation and a white plate reading operation, wherein said controller means is configured to (1) determine a direction of the movement of said carriage means based on the output of said home position sensor means when the initializing process is initiated, (2) perform a tentative homing operation of the image reading device when said home position sensor means changes the output after said carriage is moved, and (3) move said carriage means to a white plate reading position based on the performance of the tentative homing operation.

34. The image processing apparatus according to claim 33, wherein said controller means is configured to move said carriage means to the direction in which the output of said home position sensor means changes after the white plate reading operation is completed so as to perform the homing operation when the output of said home position sensor means changes.

35. An image processing apparatus, comprising:

a carriage means for carrying an image reading device;

a white plate means for being read by the image reading device for adjusting a reading level of the image reading device, said white plate means being arranged above a track of said carriage means;

a home position sensor means for detecting a position of said carriage means;

a controller means for controlling a movement of said carriage means, said controller means moving said carriage means based on an output of said home position sensor means to perform an initializing process of the image reading device including a homing operation and a white plate reading operation, wherein said controller means is configured to (1) determine whether or not an output level of the image reading device is within a proper range when the initializing process is initiated, (2) move said carriage means to a direction in which the output of said home position sensor means changes after the white plate reading operation is completed when the output level of the image reading device is within a proper range, and (3) perform the homing operation when the output of said home position sensor means changes.

36. The image processing apparatus according to claim 35, wherein said controller means is configured to (1) move said carriage means to the direction in which the output of said home position sensor means changes in a case where the output of the image reading device is not within the proper range when the initializing process is initiated, (2) perform a tentative homing operation when the output of said home position sensor means changes, (3) moves said carriage means to a position where said white plate means is read based on the tentative homing operation, (4) reverse the moving direction of said carriage means to a direction in which the output of said home position sensor means changes after the white plate reading operation is completed, and (5) perform the homing operation when the output of said home position sensor means changes.

37. The image processing according to claim 35, wherein said controller means is configured to (1) move said carriage means to the direction in which the output of said home position sensor means changes after the white plate reading operation is completed in a case where the output of the image reading device is within the proper range when the initializing process is initiated, (2) perform a tentative homing operation when the output of said home position sensor means changes in a case where the output of said home position sensor means changes while the carriage means moves within an allowable range, (3) moves said carriage means to a position where said white plate means is read based on the tentative homing operation, (4) move said carriage means to the direction in which the output of said home position sensor means changes after the white plate reading operation is completed, and (5) perform the homing operation when the output of said home position sensor means changes.

38. The image processing according to claim 35, wherein said controller means is configured to move said carriage means to a position where said white plate means is read when the apparatus is put in a shutdown state.

39. An image processing apparatus, comprising:

a carriage means for carrying an image reading device;

a white plate means for being read by the image reading device for adjusting a reading level of the image reading device, said white plate means being arranged above a track of said carriage means;

a home position sensor means for detecting a position of said carriage means;

a controller means for controlling a movement of said carriage means, said controller means moving said carriage means based on an output of said home position sensor means to perform an initializing process of the image reading device including a homing operation and a white plate reading operation, wherein said controller means is configured to perform (1) the operation recited in claim 2 when a power switch is turned on and (2) the operation recited in claim 6 when a return operation from a shutdown state is performed.

40. The image processing apparatus according to claim 33, wherein said home position sensor means includes a sensor means configured to have a property in which an output changes according to a moving direction, and wherein said controller means is configured to reverse the moving direction of said carriage means when the output of said home position sensor means changes while said carriage means moves away from said white plate means in a case where said carriage means performs a operation in which said carriage means moves from a side of said white plate means to the position where the output of said home position sensor means changes and reverses the moving direction at this position.

41. The image processing apparatus according to claim 39, wherein said home position sensor means includes a sensor means configured to have a property in which an output changes according to a moving direction, and wherein said controller means is configured to reverse the moving direction of said carriage means when the output of said home position sensor means changes while said carriage means moves away from said white plate means in a case where said carriage means performs a operation in which said carriage means moves from a side of said white plate means to the position where the output of said home position sensor means changes and reverses the moving direction at this position.

42. The image processing apparatus according to claim 33, wherein said home position sensor means includes a sensor means configured to have a property in which an output changes according to a moving direction, and wherein said controller means is configured to perform the tentative homing operation when the output of said home position sensor means changes while the carriage means moves to said white plate means.

43. The image processing apparatus according to claim 36, wherein said home position sensor means includes a sensor means configured to have a property in which an output changes according to a moving direction, and wherein said controller means is configured to perform the tentative homing operation when the output of said home position sensor means changes while the carriage means moves to said white plate means.

44. The image processing apparatus according to claim 39, wherein said home position sensor means includes a sensor means configured to have a property in which an output changes according to a moving direction, and wherein said controller means is configured to perform the tentative homing operation when the output of said home position sensor means changes while the carriage means moves to said white plate means.

45. The image processing apparatus according to claim 33, wherein said controller means is configured to move said carriage means to one of directions in which said carriage means moves from said white plate means to a position where the output of said home position sensor means changes and in which said carriage means moves from the position where the output of said home position sensor means changes to said white plate means, and wherein said controller means is configured to stop an operation of said carriage means when the output of said home position sensor means does not change even if said carriage means moves within an allowable range.

46. The image processing apparatus according to claim 35, wherein said controller means is configured to move said carriage means to one of directions in which said carriage means moves from said white plate means to a position where the output of said home position sensor means changes and in which said carriage means moves from the position where the output of said home position sensor means changes to said white plate means, and wherein said controller means is configured to stop an operation of said carriage means when the output of said home position sensor means does not change even if said carriage means moves within an allowable range.

47. The image processing apparatus according to claim 39, wherein said controller means is configured to move said carriage means to one of directions in which said carriage means moves from said white plate means to a position where the output of said home position sensor means changes and in which said carriage means moves from the position where the output of said home position sensor means changes to said white plate means, and wherein said controller means is configured to stop an operation of said carriage means when the output of said home position sensor means does not change even if said carriage means moves within an allowable range.

* * * * *